United States Patent
Guetta et al.

(10) Patent No.: US 12,308,960 B2
(45) Date of Patent: May 20, 2025

(54) CODING ENHANCEMENT USING SPINAL CODES

(71) Applicant: QUALCOMM INCORPORATED, San Diego, CA (US)

(72) Inventors: Matan Guetta, Kiryat Ono (IL); Peer Berger, Hod Hasharon (IL); David Yunusov, Holon (IL); Gideon Shlomo Kutz, Ramat Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 18/472,201

(22) Filed: Sep. 21, 2023

(65) Prior Publication Data
US 2024/0322944 A1    Sep. 26, 2024

(30) Foreign Application Priority Data

Mar. 21, 2023  (IL) .......................... 301520

(51) Int. Cl.
*H04L 1/00* (2006.01)
*H04L 1/1812* (2023.01)

(52) U.S. Cl.
CPC .......... *H04L 1/0054* (2013.01); *H04L 1/0042* (2013.01); *H04L 1/1816* (2013.01)

(58) Field of Classification Search
CPC .... H04L 1/0054; H04L 1/0042; H04L 1/1816
See application file for complete search history.

(56) References Cited

U.S. PATENT DOCUMENTS 9,270,412 B2 *  2/2016 Perry .................... H04L 1/0068
2015/0003557 A1  1/2015 Perry et al.

OTHER PUBLICATIONS

International Search Report and Written Opinion—PCT/US2024/018129—ISA/EPO—Jun. 19, 2024.
Meng S., et al., "Analysis and Optimization of the HARQ-Based Spinal Coded Timely Status Update System", IEEE Transactions on Communications, IEEE Service Center, Piscataway, NJ. USA, vol. 70, No. 10, Aug. 10, 2022 , XP011923670, Oct. 2022, pp. 6425-6440, abstract, sections I-III.

* cited by examiner

*Primary Examiner* — Rahel Guarino
(74) *Attorney, Agent, or Firm* — Holland & Hart LLP

(57) ABSTRACT

Methods, systems, and devices for wireless communication are described. A transmitter device may encode information for a message using a spinal code. The transmitter device may divide the information into sets of bits each including a variable quantity k of bits, and map the sets of bits to symbols to generate a message. The transmitter device may transmit the symbols in an order based on the k values (symbols with smaller k values at the beginning of the message and larger k values at the end). Based on receiving the message, a receiver device may identify the k of each symbol and decode the symbols. The receiver device may identify a partial codeword or determine a likelihood of error associated with the message, which the receiver device may indicate via a feedback message. The transmitter device may retransmit a portion of the message based on the feedback.

28 Claims, 17 Drawing Sheets

CODING ENHANCEMENT USING SPINAL CODES

CROSS REFERENCE

The present Application for Patent claims the benefit of Israel Provisional Patent Application No. 301520 by GUETTA et al., entitled "CODING ENHANCEMENT USING SPINAL CODES," filed Mar. 21, 2023, assigned to the assignee hereof, and expressly incorporated by reference herein.

FIELD OF TECHNOLOGY

The following relates to wireless communication, including encoding using spinal codes.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support encoding using spinal codes. For example, the described techniques provide for encoding and decoding a message based on a spinal code and a variable k value. A transmitter device may encode a message (composed from bits) using a spinal code, which may include dividing information (information bits, data) into sets of k bits, where k is variable. That is, each set of bit may include a different quantity of bits. The transmitter device may map each set of k bits to a symbol to generate a message of a set of symbols and transmit the set of symbols in an order based on the k values (e.g., from smallest to largest k). In this way, the transmitter device may map smaller values of k to earlier-transmitted symbols (which may depend on a puncturing scheme), thereby increasing an overall likelihood that a receiver device correctly decodes the message. The receiver device may receive and decode the set of symbols based on identifying respective quantities of the bits in each symbol. The receiver device may determine that a likelihood of error associated with a cost function satisfies an error threshold based on decoding the set of symbols, and the receiver device may transmit a feedback message indicating the likelihood of error. Based on receiving the feedback message, the transmitter device may retransmit at least a portion of the set of symbols, which the receiver device may attempt to decode again. The transmitter device may retransmit the portion of the set of symbols according to the cost function, which may increase a probability of successfully decoding the message with fewer symbols having been transmitted, hence, increasing the rate.

A method for wireless communication at a receiver device is described. The method may include receiving a message including a set of symbols encoded using a spinal code, where symbols of the set of symbols are transmitted in a first order based on a second order of sets of bits in information of the message, identifying a quantity of bits associated with each symbol of the set of symbols based on receiving the message, where a first subset of the set of symbols are associated with a first quantity of bits and a second subset of the set of symbols are associated with a second quantity of bits different than the first quantity of bits, decoding the set of symbols based on identifying the quantity of bits, determining that a likelihood of an error associated with the message satisfies a threshold based on decoding the set of symbols, and transmitting a feedback message based on determining that the likelihood of the error associated with the message satisfies the threshold.

A receiver device is described. The receiver device may include at least one memory, and at least one processor communicatively coupled with the at least one memory. The at least one processor may be operable to cause the receiver device to receive a message including a set of symbols encoded using a spinal code, where symbols of the set of symbols are transmitted in a first order based on a second order of sets of bits in information of the message, identify a quantity of bits associated with each symbol of the set of symbols based on receiving the message, where a first subset of the set of symbols are associated with a first quantity of bits and a second subset of the set of symbols are associated with a second quantity of bits different than the first quantity of bits, decode the set of symbols based on identifying the quantity of bits, determine that a likelihood of an error associated with the message satisfies a threshold based on decoding the set of symbols, and transmit a feedback message based on determining that the likelihood of the error associated with the message satisfies the threshold.

An apparatus for wireless communication at a receiver device is described. The apparatus may include means for receiving a message including a set of symbols encoded using a spinal code, where symbols of the set of symbols are transmitted in a first order based on a second order of sets of bits in information of the message, means for identifying a quantity of bits associated with each symbol of the set of symbols based on receiving the message, where a first subset of the set of symbols are associated with a first quantity of bits and a second subset of the set of symbols are associated with a second quantity of bits different than the first quantity of bits, means for decoding the set of symbols based on identifying the quantity of bits, means for determining that a likelihood of an error associated with the message satisfies a threshold based on decoding the set of symbols, and means for transmitting a feedback message based on determining that the likelihood of the error associated with the message satisfies the threshold.

A non-transitory computer-readable medium storing code for wireless communication at a receiver device is described. The code may include instructions executable by a processor to receive a message including a set of symbols encoded using a spinal code, where symbols of the set of symbols are transmitted in a first order based on a second order of sets of bits in information of the message, identify a quantity of bits associated with each symbol of the set of symbols based on receiving the message, where a first subset of the set of symbols are associated with a first quantity of bits and a second subset of the set of symbols are associated with a second quantity of bits different than the first quantity of bits, decode the set of symbols based on identifying the quantity of bits, determine that a likelihood of an error associated with the message satisfies a threshold based on decoding the set of symbols, and transmit a feedback message based on determining that the likelihood of the error associated with the message satisfies the threshold.

In some examples of the method, apparatuses, and non-transitory computer-readable medium described herein, decoding the set of symbols may include operations, features, means, or instructions for identifying a set of spines associated with the set of symbols based on the set of symbols being encoded using the spinal code, where identifying the quantity of bits may be based on identifying the set of spines.

Some examples of the method, apparatuses, and non-transitory computer-readable medium described herein may further include operations, features, means, or instructions for receiving a retransmission of a portion of the set of symbols based on transmitting the feedback message.

Some examples of the method, apparatuses, and non-transitory computer-readable medium described herein may further include operations, features, means, or instructions for decoding the portion of the set of symbols based on identifying the quantity of bits associated with each symbol of the set of symbols.

Some examples of the method, apparatuses, and non-transitory computer-readable medium described herein may further include operations, features, means, or instructions for determining at least a partial codeword based on decoding the set of symbols.

In some examples of the method, apparatuses, and non-transitory computer-readable medium described herein, the first quantity of bits and the second quantity of bits may be based on an average codeword size constraint.

In some examples of the method, apparatuses, and non-transitory computer-readable medium described herein, the feedback message indicates a first symbol of the set of symbols that may be associated with the likelihood of the error.

A method for wireless communication at a transmitter device is described. The method may include dividing information for transmission into sets of bits, each set in a first subset of the sets of bits including a first quantity of bits and each set in a second subset of the sets of bits including a second quantity of bits different than the first quantity of bits, mapping, based on dividing the information, each set of the sets of bits to a symbol to generate a message including a set of symbols, transmitting the message including the set of symbols based on the mapping, where symbols of the set of symbols are transmitted in a first order based on a second order of the sets of bits in the information, and retransmitting a portion of the set of symbols based on a likelihood of error associated with the message.

A transmitter device is described. The transmitter device may include at least one memory, and at least one processor communicatively coupled with the at least one memory. The at least one processor may be operable to cause the transmitter device to divide information for transmission into sets of bits, each set in a first subset of the sets of bits including a first quantity of bits and each set in a second subset of the sets of bits including a second quantity of bits different than the first quantity of bits, mapping, base at least in part on dividing the information, each set of the sets of bits to a symbol to generate a message including a set of symbols, transmit the message including the set of symbols based on the mapping, where symbols of the set of symbols are transmitted in a first order based on a second order of the sets of bits in the information, and retransmit a portion of the set of symbols based on a likelihood of error associated with the message.

An apparatus for wireless communication at a transmitter device is described. The apparatus may include means for dividing information for transmission into sets of bits, each set in a first subset of the sets of bits including a first quantity of bits and each set in a second subset of the sets of bits including a second quantity of bits different than the first quantity of bits, means for mapping, based on dividing the information, each set of the sets of bits to a symbol to generate a message including a set of symbols, means for transmitting the message including the set of symbols based on the mapping, where symbols of the set of symbols are transmitted in a first order based on a second order of the sets of bits in the information, and means for retransmitting a portion of the set of symbols based on a likelihood of error associated with the message.

A non-transitory computer-readable medium storing code for wireless communication at a transmitter device is described. The code may include instructions executable by a processor to divide information for transmission into sets of bits, each set in a first subset of the sets of bits including a first quantity of bits and each set in a second subset of the sets of bits including a second quantity of bits different than the first quantity of bits, mapping, base at least in part on dividing the information, each set of the sets of bits to a symbol to generate a message including a set of symbols, transmit the message including the set of symbols based on the mapping, where symbols of the set of symbols are transmitted in a first order based on a second order of the sets of bits in the information, and retransmit a portion of the set of symbols based on a likelihood of error associated with the message.

Some examples of the method, apparatuses, and non-transitory computer-readable medium described herein may further include operations, features, means, or instructions for encoding the set of symbols using a spinal code based on hashing each set of the sets of bits and a spine of a set of spines associated with the spinal code and mapping each set of the sets of bits to the symbol based on the spinal code.

Some examples of the method, apparatuses, and non-transitory computer-readable medium described herein may further include operations, features, means, or instructions for identifying the portion of the set of symbols for retransmission based on a puncturing scheme associated with the message, where retransmitting the portion of the set of symbols may be based on the identifying.

Some examples of the method, apparatuses, and non-transitory computer-readable medium described herein may further include operations, features, means, or instructions for determining the puncturing scheme based on the first quantity of bits and the second quantity of bits.

Some examples of the method, apparatuses, and non-transitory computer-readable medium described herein may further include operations, features, means, or instructions for mapping each set of the sets of bits to the symbol may be based on a spinal code associated with the message.

Some examples of the method, apparatuses, and non-transitory computer-readable medium described herein may further include operations, features, means, or instructions for receiving a feedback message indicating the error associated with the message, where retransmitting the portion may be based on receiving the feedback message.

Some examples of the method, apparatuses, and non-transitory computer-readable medium described herein may further include operations, features, means, or instructions for identifying the first quantity of bits for each set of the first subset and the second quantity of bits for each set of the second subset based on an average codeword size constraint.

DETAILED DESCRIPTION

Figure 1:
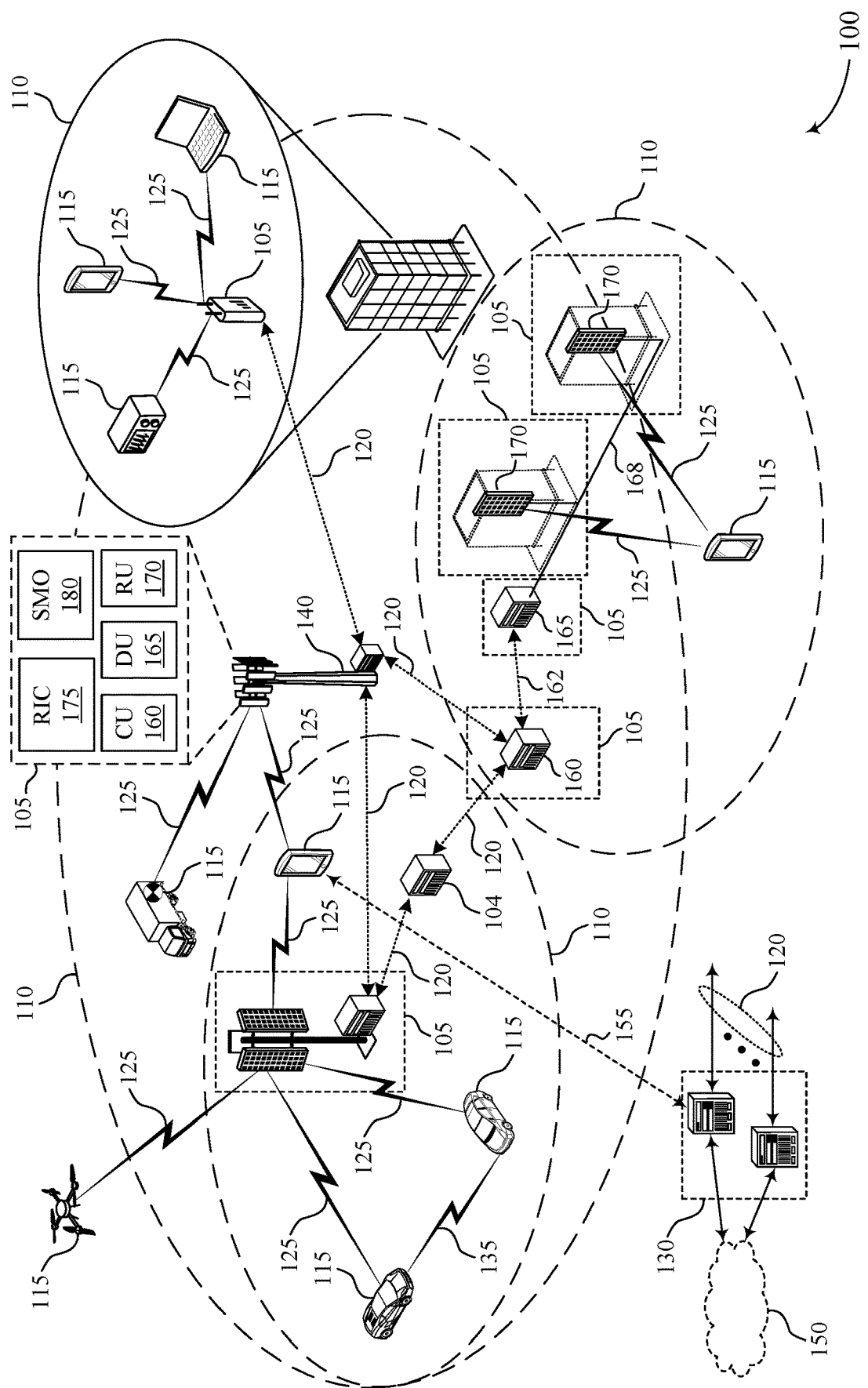
FIG. 1 illustrates an example of a wireless communications system that supports encoding using spinal codes in accordance with one or more aspects of the present disclosure.

Transmitters and receivers in wireless communications systems may encode and decode messages using rate-less coding schemes. Rate-less coding schemes may enable improved rate adaptation, high signaling capacity (even in cases with high device mobility), and improved bit loading capabilities. One example of rate-less coding includes spinal codes, which account for time-varying channel conditions without relying on an explicit bit-rate selection. For example, a transmitter device may transmit a message via a channel at a rate higher than a channel may sustain and iteratively retransmit more information bits (symbols) to reduce an effective rate until a receiver device may successfully decode the message. In addition, spinal coding includes a sequential application of a random hash function to bits of the message to produce a sequence of coded bits and symbols for transmission. That is, the transmitter device may divide the message into sets of k bits, which may be mapped to a symbol for transmission to the receiver device. However, using a constant k may increase decoding complexity and reduce performance (compared to a variable k scheme) as more bits than needed may be transmitted.

The techniques descried herein support a spinal coding scheme that uses a variable k, which may reduce decoding complexity, improve communication performance, and improve an unequal error protection (UEP) property. A transmitter device may encode a set of messages using a spinal code, which may include dividing information (information bits, data) into sets of k bits, where k is variable. That is, each set of bits may include a different quantity of bits. The transmitter device may map each set of k bits to symbols (e.g., to generate a message of a set of symbols) and transmit the symbols in an order based on the k values (e.g., from smallest to largest k). In this way, the transmitter device may map smaller values of k to earlier-symbols, thereby reducing the probability of error at earlier symbols (associated with smaller k values) compared to later symbols (associated with higher k values).

The receiver device may receive and decode the set of symbols based on identifying respective quantities of the bits in each symbol. The receiver device may determine that a likelihood of error associated with a cost function satisfies an error threshold based on decoding the set of symbols, and the receiver device may transmit a feedback message indicating the likelihood of error. Based on receiving the feedback message, the transmitter device may retransmit at least a portion of the set of symbols, which the receiver device may attempt to decode again (with a higher probability of decoding the entire message).

Aspects of the disclosure are initially described in the context of wireless communications systems. Aspects of the disclosure are then described in the context of spinal codes, encoder schemes, and process flows. Aspects of the disclosure are further illustrated by and described with reference to apparatus diagrams, system diagrams, and flowcharts that relate to encoding using spinal codes.

FIG. 1 illustrates an example of a wireless communications system 100 that supports encoding using spinal codes in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support encoding using spinal codes as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_S=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-OW), a Packet Data Network (PDN) gateway (P-OW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitter device or a receiver device (e.g., a network entity 105, a UE 115) to shape or steer an antenna beam (e.g., a transmit beam, a receive beam) along a spatial path between the transmitter device and the receiver device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitter device or a receiver device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitter device or receiver device, or with respect to some other orientation).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Current CSI-RS-based channel capacity tracking techniques may have several limitations, including inaccurate CSI-RS estimations, complex and inaccurate channel prediction (based on a channel being sampled only at discrete times of given CSI-RS slots), a loop delay of between transmissions and retransmissions (based on ACK/NACK feedback), among other limitations. Accordingly, some wireless communications systems 100 may be based on rate-less schemes, which may have improvements over CSI-RS-based channel capacity tracking. Rate-less schemes may achieve an improved rate adaptation without relying on more inefficient CSI-RS-based rate adaptation (such that wireless devices may achieve capacity even if the wireless communications system 100 includes high mobility), improved capability of bit loading to approach capacity in frequency-selective and time-selective channels, and improved performance over fixed-rate systems due to a hedging effect (even for additive white Gaussian noise (AWGN) schemes).

A rate adaptation scheme may provide a framework for such rate-less coding schemes. The rate adaptation scheme may include a multiple incremental redundancy scheme (MIRS), which may be based on multiple incremental redundancy (IR) HARQs (IR-HARQs) showing gains over existing CSI-RS-based rate adaptation. Instead of attempting to predict a channel capacity, MIRS techniques may include a relay on extensive usage of IR-HARQ. A first transmission may correspond to a higher (e.g., highest) speculated MCS for a current channel, and each retransmission may add a small amount of redundancy. A transmitter device may stop the retransmissions when a receiver device has successfully decoded a message as indicated by continuous ACK/NACK feedback. Alternatively, the transmitter device may adjust wide band precoding based on continuous ACK/NACK transmissions. In such cases, communications at a code rate capacity may be achieved regardless of mobility.

To benefit from the full potential of MIRS, rate-less coding schemes may be incorporated into the MIRS adaptation scheme. An example of a rate-less coding scheme may include a spinal coding scheme. In using spinal coding, a transmitter device may encode data once and change a channel rate through a total quantity of channel uses (e.g., instead of re-encoding the data as in other schemes) via puncturing schemes without increasing a decoding cost.

The wireless communications system 100 may support a spinal coding scheme based dividing data into sets of k bits, where k is variable, which may enhance decoder performance and reduce complexity. A transmitter device (e.g., a network entity 105) may divide information for transmission into sets of k bits, where k may vary across sets. The transmitter device may map each set of bits to a symbol to generate a message that includes a set of symbols. In this way, the transmitter device may encode the symbols using a spinal code. The transmitter device may transmit each symbol of the message in an order based on the quantities of bits k in each symbol (e.g., from lowest k to highest k). Based on receiving the message, a receiver device (e.g., a UE 115) may identify the quantity of bits k in each symbol and decode the set of symbols based on identifying the quantities. In some examples, based on decoding the set of symbols, the receiver device may determine that a likelihood of error (e.g., based on a cost function) associated with the message satisfies a threshold, and may transmit a feedback (e.g., ACK/NACK) indicating the likelihood of error to the transmitter device. Based on the feedback message, the transmitter device may retransmit at least a portion of the set of symbols based on which symbols were associated with the indicated likelihood of error.

Figure 2:
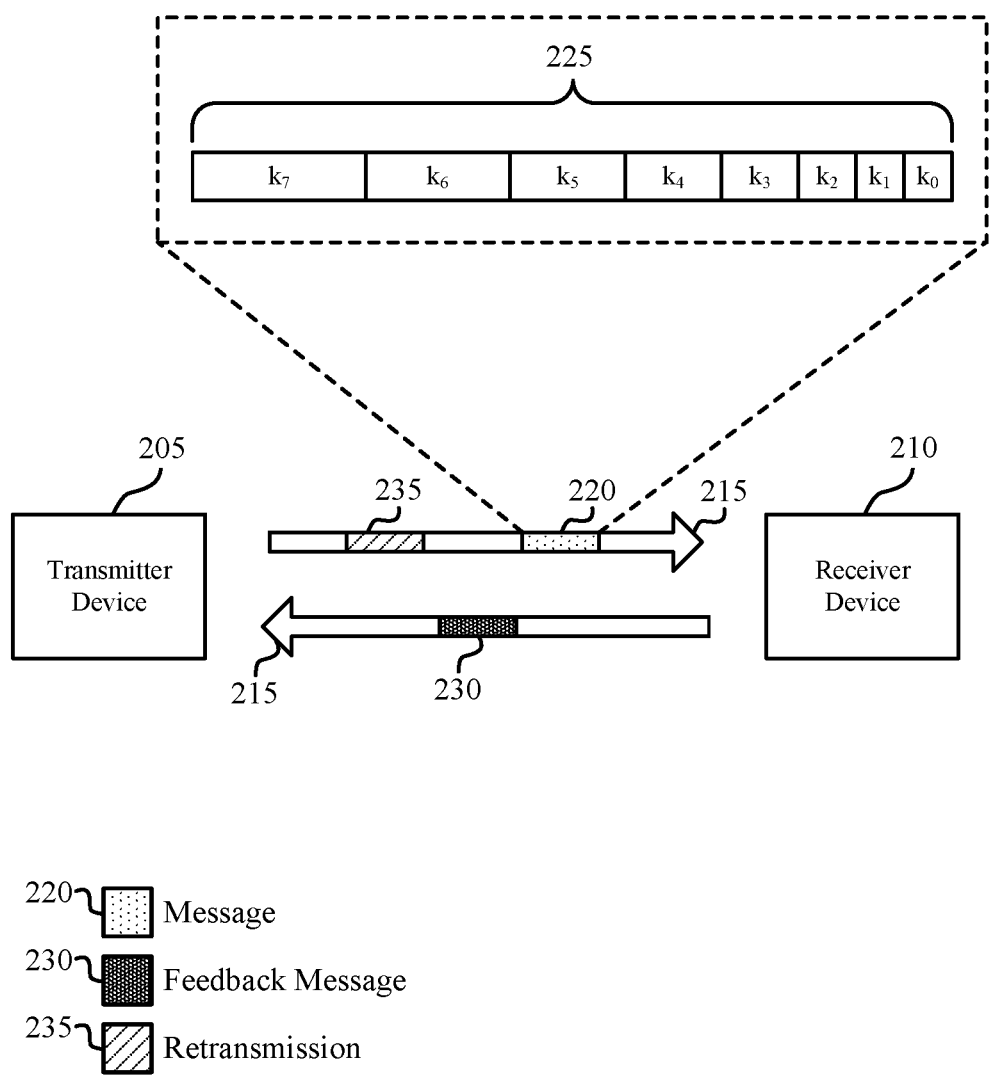
FIG. 2 illustrates an example of a wireless communications system that supports encoding using spinal codes in accordance with one or more aspects of the present disclosure.

FIG. 2 illustrates an example of a wireless communications system 200 that supports encoding using spinal codes in accordance with one or more aspects of the present disclosure. In some examples, the wireless communications system 200 may implement aspects of the wireless communications system 100 or may be implemented by aspects of the wireless communications system 100. For example, the wireless communications system 200 may include a transmitter device 205 and a receiver device 210, which may be examples of corresponding devices described herein. The transmitter device 205 and the receiver device 210 may support a spinal coding scheme based on a variable quantity of bits (k) mapped to each symbol of a message, which may enhance decoder performance and reduce complexity, among other benefits.

The wireless communications system 200 may support communications between the transmitter device 205 (e.g., a network entity 105 or other wireless device) and the receiver device 210 (e.g., a UE 115 or other wireless device). For example, the transmitter device 205 and the receiver device 210 may communicate via communications links 215, which may be examples of communications links 125 described herein with reference to FIG. 1.

The transmitter device 205 and the receiver device 210 may support spinal coding, which may include transmitting symbols with varying quantities of k bits. Spinal codes are a class of rate-less code that may enable the transmitter device 205 and the receiver device 210 to manage time-varying channel conditions without relying on an explicit bit rate selection. Using spinal codes, the transmitter device 205 may transmit at a rate higher than a channel may sustain and iteratively retransmit more information bits (symbols) to lower an effective code rate until the receiver device 210 successfully decodes a message (which may be indicated to the transmitter device 205 via ACK/NACK feedback).

Using spinal codes, the transmitter device 205 may encode a message once and change a channel rate based on a total quantity of channel uses (e.g., instead of re-encoding data as in other coding schemes). That is, the channel rate is determined according to a quantity of retransmissions used for the receiver device 210 to successfully decode information bits. The transmitter device 205 may transmit a message 220 including a set of symbols 225 encoded using a spinal code. To generate the message 220, the transmitter device 205 may divide a message that includes n information bits for transmission to the receiver device 210 into sets of bits, where each set in a first subset of the sets of bits including a first quantity of bits $k_i$ and a second subset of the sets of bits including a second quantity of bits $k_j$ different than the first quantity of bits. For example, the set of symbols 225 may include 8 symbols, and each symbol may include a quantity $k_i$ bits ($k_0$ through $k_7$). That is, the transmitter device 205 may split the message 220, which may include n information bits, into $n/k_{avg}$ sets (e.g., chunks) of bits of size $k_i$, where the $k_i$ values differ, and $$k_{avg} = \frac{1}{N}\sum_{i=1}^{N} k_i$$

(the average k, over all $k_i$).

Based on dividing the information, the transmitter device 205 may map each set of the sets of bits to a symbol to generate the message 220 including the set of symbols 225. The transmitter device 205 may transmit symbols of the set of symbols 225 in a first order based on a second order of sets of bits in information of the message 220. The second order of sets of bits may correspond to the quantity of bits in each symbol, where $k_0$ (corresponding to a first symbol of the set of symbols 225) may be smaller than $k_1$ (corresponding to a second symbol of the set of symbols 225), which may be smaller than $k_2$ (corresponding to a third symbol of the set of symbols 225), and so on. That is, the information may be divided into sets of bits of different sizes, where the transmitter device 205 may map sets of bits with a smaller quantity of bits to earlier symbols of the set of symbols 225. Accordingly, the first order may indicate that the symbols of the set of symbols 225 are transmitted in an order based on the quantity $k_i$ bits mapped to each symbol, according to a puncturing scheme, and a decoder likelihood of error (a cost function).

In some examples, the mapping may be fixed such that a mean codeword may be $$k\left[\frac{\text{bits}}{\text{symbols}}\right].$$

That is, the quantity of bits k for each symbol may be based on an average codeword size constraint. In addition, dividing the message 220 of n bits into sets of bits having unequal k values may follow $\sum_i^{sets} k_i = n$, while maintaining the average codeword size constraint of $$k\left[\frac{\text{bits}}{\text{symbols}}\right] : \frac{\sum_i^{sets} k_i}{\text{num\_sets}} = k,$$

where num_sets indicates a quantity of sets of bits the n bits are divided among, and where each set $set_i$ includes a different k value.

In some cases, the transmitter device 205 may use additional techniques to encode the message 220 using a spinal code. For example, the transmitter device 205 may sequentially apply a random hash function h to information bits of the message 220 to produce a sequence of coded bits and the set of symbols 225 for transmission. In this way, the transmitter device 205 may encode the set of symbols 225 using the spinal code based on hashing each set of the sets of bits and a spine of a set of spines associated with the spinal code, where mapping the sets of bits to the set of symbols 225 may be based on the spinal code. The encoding may ensure that two input messages that differ even by one bit may lead to different coded sequences after a point at which they differ, which may provide resilience to noise and bit errors. Additional details of the encoding scheme are described herein with reference to FIG. 4.

The transmitter device 205 may transmit the set of symbols 225 such that symbols with a lower quantity of bits per symbol are transmitted at the beginning of the message 220 and symbols with a relatively higher quantity of bits per symbol are transmitted at the end of the message 220. That is, the transmitter device 205 may transmit the message 220 based on the mapping, where the symbols of the set of symbols are transmitted in a first order (e.g., lowest k to highest k) based on the second order of the sets of bits (e.g., the varying k values) in the information. For example, based on the quantities of bits per symbol, the transmitter device 205 may transmit a symbol corresponding to $k_0$, followed by a symbol corresponding to $k_1$, followed by a symbol corresponding to $k_2$, followed by a symbol corresponding to $k_3$, followed by a symbol corresponding to $k_4$, followed by a symbol corresponding to $k_5$, followed by a symbol corresponding to $k_6$, followed by a symbol corresponding to $k_7$.

In some examples, the receiver device 210 may receive the message 220 and identify each k value. That is, the receiver device 210 may identify a quantity of bits associated with each symbol of the set of symbols 225. The receiver device 210 may decode the set of symbols 225 based on identifying the quantity of bits. In some examples, the decoding may be based on a machine learning approach (e.g., a reduced-complexity bubble decoder or list decoder), which may run based on a time polynomial in the message size. Additional details regarding the decoding process are described herein with reference to FIG. 4.

Based on decoding the set of symbols 225, the receiver device 210 may determine that a likelihood of an error associated with the message 220 satisfies a threshold. In some cases, the receiver device 210 may determine the likelihood of the error based on a cost function calculated for each of the symbols of the set of symbols 225 and corresponding spines of the spinal code. In some examples, the receiver device 210 may transmit a feedback message 230 to the transmitter device 205 based on determining the likelihood of the error. For example, the receiver device 210 may transmit an ACK/NACK indication in the feedback message 230 indicating whether the receiver device 210 successfully decoded a symbol (ACK) or failed to decode a symbol based on the error (NACK). In some examples, the feedback message 230 may indicate a first set of the set of symbols 225 that is associated with the determined likelihood of the error such that the transmitter device 205 knows where to begin a retransmission. At this point, the receiver device 210 may determine at least a partial codeword from the message 220 based on decoding the set of symbols 225 successfully.

Based on receiving the feedback message 230, and particularly if the feedback message 230 indicated that the likelihood of the error satisfies the threshold, the transmitter device 205 may retransmit a portion of the set of symbols 225. That is, instead of retransmitting the message 220 when the receiver device 210 fails to successfully decode one or more symbols, the transmitter device 205 may utilize the spinal code to transmit a retransmission 235 of just the symbols associated with the error. In some examples, the transmitter device 205 may determine the portion of the set of symbols 225 to retransmit based on The receiver device 210 may decode the portion of the set of symbols 225 based on again identifying their respective quantities of bits (k values), and if the decoding is successful, the receiver device 210 may determine the partial codeword.

By starting the decoding process with a relatively small k (which may be associated with a relatively lower probability of error), the retransmission 235 may be focused to specific locations of the spinal code associated with relatively high k values. This may reduce decoder complexity by saving previous states of the decoding procedure until the retransmission state, and continuing the decoding process starting from this point on for later retransmissions. In addition, in focusing the retransmissions to symbols with higher k values, an overall rate may increase based on decreasing a total quantity of channel uses, overall improving performance of the wireless devices.

Figure 3:
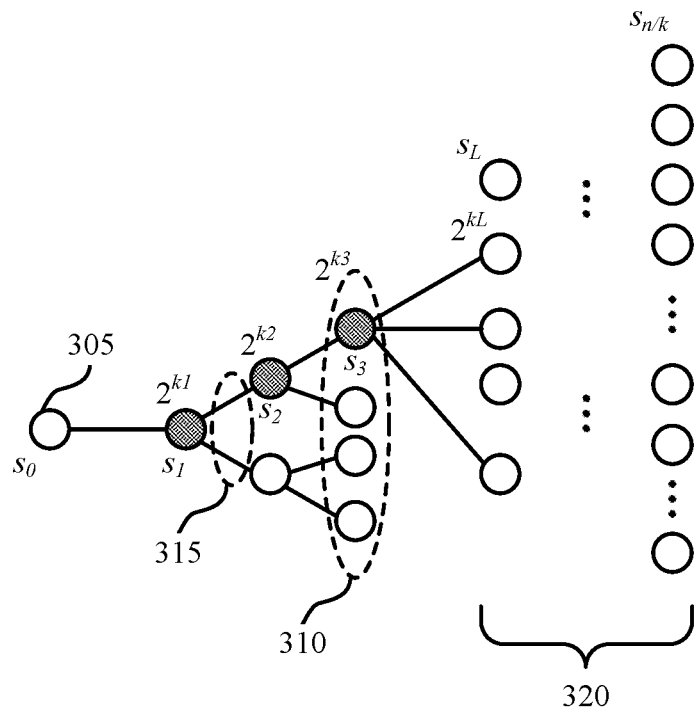
FIG. 3 illustrates an example of a spinal code that supports encoding using spinal codes in accordance with one or more aspects of the present disclosure.

FIG. 3 illustrates an example of a spinal code 300 that supports encoding using spinal codes in accordance with one or more aspects of the present disclosure. In some examples, the spinal code 300 may be implemented by wireless communications systems 100 and 200. For example, the spinal code 300 may be implemented by a transmitter device and a receiver device described herein with reference to FIGS. 1 and 2. In some examples, the transmitter device may use the spinal code 300 to encode a set of symbols included in a message, and the receiver device may decode one or more symbols of the set of symbols based on the spinal code 300.

In some examples, the transmitter device may use the spinal code 300 to encode information in a message. The spinal code 300 may include the application of spine values $s_i$ to a hashing function to encode a set of bits, which is described herein with reference to FIG. 4. In some examples, an initial spine value 305 may be so, where $s_0=0$. Each spine value 305 (only one of which is labeled in FIG. 3) of the spinal code 300 may correspond to a spine 310 (where only one of the spines 310 is labeled in FIG. 3). Each spine 310 may include a root symbol and one or more symbols. In addition, each root of a spine (each root symbol labeled by spine values) may be associated with a set of nodes 315 (where only one set of nodes 315 is labeled in FIG. 3). A node may indicate a link between a root symbol and one or more additional symbols, root symbols, or both. For example, a spine value $s_1$ may be associated with a first spine, and may include $2^{k_1}$ nodes. In addition, a spine value $s_2$ may be associated with a second spine and may include $2^{k_2}$ nodes, a spine value $s_3$ may be associated with a third spine, and may include $2^{k_3}$ nodes, and so on. As such, for a small k, a total quantity of spines may be larger, but a quantity of nodes $2^k$ may be smaller. Alternatively, for a large k, a total quantity of spines may be relatively smaller, but the quantity of nodes $2^k$ may be higher. The spinal code 300 may include a quantity of L spines (e.g., a spine with a spine value 305 of $s_L$) and thus $2^{k_L}$ nodes. In some examples, the spinal code 300 may include up to a quantity of n/k spines (e.g., up to a spine with a spine value 305 of $s_{n/k}$), where n is a quantity of bits in the information.

In some examples, the receiver device may identify the spines as being associated with a set of symbols that are encoded using the spinal code 300, and the receiver device may identify the values of k for each symbol based on the spines, which may be used for decoding the symbols. For lower k values, the spinal code 300 (e.g., depicted as a decoding tree) may converge to a real partial codeword. For example, the receiver device may determine the real partial codeword from the spine 310 corresponding to the spine value $s_3$. Additionally, more errors may occur at symbols toward the end of the tree (for higher k values). For example, the spine $S_L$ may have a higher error than the first three spines. When transmitting feedback indicating a likelihood of the error associated with the message (one or more symbols of the message), the receiver device may indicate a spine or a symbol at which the transmitter device is to begin retransmitting the symbols. In this way, the receiver device may refrain from beginning at the beginning of the decoding tree to decode the retransmitted symbols, and instead may pick off at the point where it detected the error. For example, the retransmission may include spines 320.

In some examples, the described techniques may improve a UEP of the spinal encoder, particularly for extended reality (XR) devices and applications. For example, for a uniform k, a probability of error may be given by $p_{e,s_{j1}}|\vec{S}_0 \ldots _{j1-1} = P_{e,s_{j2}}|\vec{S}_0 \ldots _{j2-1}$, $\forall j1, j2$. Since the receiver device may use a bubble decoder technique to decode the message (which is described herein with reference to FIG. 4), where the bubble decoder is a sequential decoder, the decoding may be associated with an error propagation $p_{e,s_j}=1-\Pi_{i=1}^j(1-P_{e,s_i}) \cong UB = \Sigma_{i=1}^j P_{e,s_i}$. As such, a probability (or likelihood) of an error in a symbol at the beginning of the message or decoding tree may be smaller than at the end of the message, though an error probability for the spines may be relatively uniform, given by $p_{e,s_i} < p_{e,s_j} \forall L < j$, where i and j may represent indices of a spine. This property of the spinal code 300 may benefit the UEP, as with a variable k, $P_{e,s_{j1}}|S_0 \ldots _{j1-1} \leq P_{e,s_{j2}}|S_0 \ldots _{j2-1}$, where $j1 < j2$.

Figure 4:
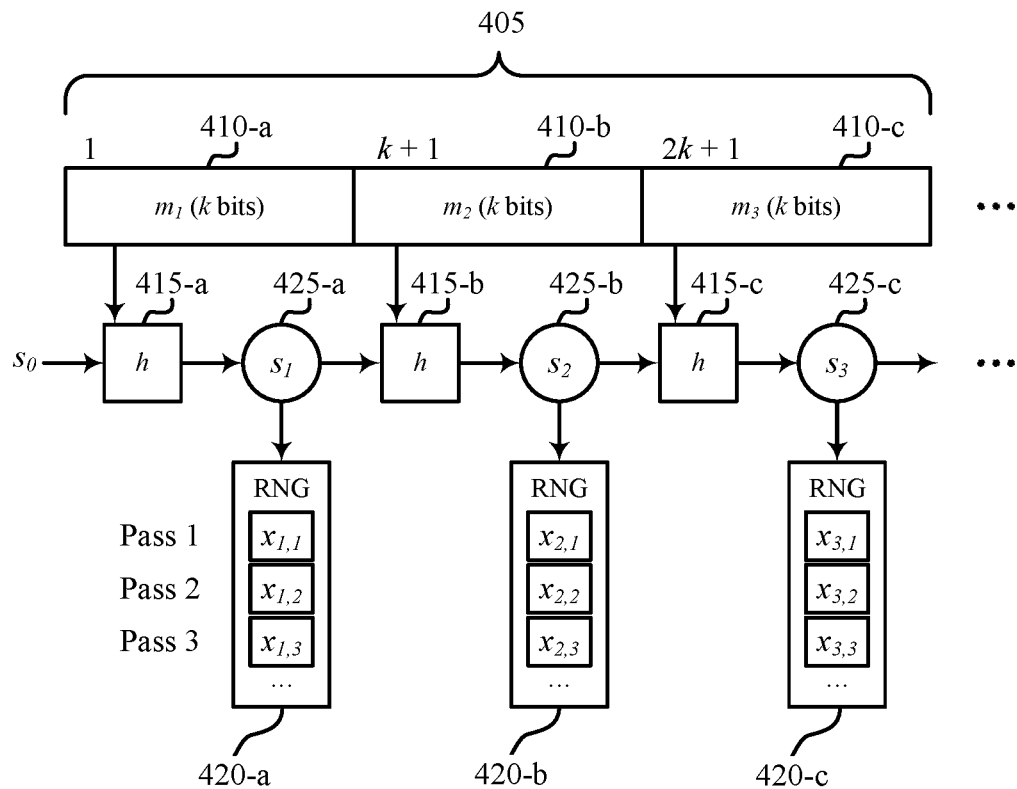
FIG. 4 illustrates an example of an encoder scheme that supports encoding using spinal codes in accordance with one or more aspects of the present disclosure.

FIG. 4 illustrates an example of an encoder scheme 400 that supports encoding using spinal codes in accordance with one or more aspects of the present disclosure. In some examples, the encoder scheme 400 may be implemented by wireless communications systems 100 and 200. For example, the encoder scheme 400 may be implemented by a transmitter device and a receiver device described herein with reference to FIGS. 1 and 2. In some examples, the transmitter device may use the encoder scheme 400 to encode a set of symbols included in a message, and the receiver device may decode the set of symbols based on the encoding.

As described herein with reference to FIG. 2, the transmitter device may divide information, including n bits, for transmission into sets of bits, each set of bits including a different quantity of k bits (k is variable). Based on dividing the information, the transmitter device may map each set of k bits 410 to a respective symbol to generate the message 405 including the set of symbols. In some cases, the transmitter device may encode the message 405 using a spinal code (according to the encoder scheme 400). For example, the transmitter device may use a random hash function 415 (h) and a random number generator (RNG) 420 to encode the message 405, where the hash function 415 and the RNG 420 may both be known to the transmitter device and the receiver device.

In some examples, a hash function 415 may use two inputs including a v bit state (a spine value 425 of a spinal code) and a set (e.g., chunk) of k message bits, and may output a new v bit state (e.g., 32 bits). As such, the transmitter device may generate a spine value 425 of v bits by sequentially hashing together groups of k bits from an input message without adding redundancy bits as may be done in other codes. Each of the n/k spine values may be used as a seed to an RNG 420, and each RNG 420 may generate a sequence of random c-bit numbers which may be converted into output in-phase quadrature (IQ) constellation symbols via a mapping function. In such a manner, later the value of later symbols may be based on the value of earlier symbols. Such characteristics may allow for two sets of information with even a single bit different to have substantially different encoded values after a spinal code is applied.

In the example of FIG. 4, the message 405 may include a set of k bits 410-a (e.g., $m_1$, k) a set of k bits 410-b (e.g., $m_2$, k+1), and a set of k bits 410-c (e.g., $m_3$, 2k+1). The message 405 may include additional sets of k bits 410. A spine $s_0(s_0=0)$ and a set of k bits 410-a may be input to a hash function 415-a. In such cases, h:$\{0, 1\}^v \times \{0, 1\}^k \rightarrow \{0, 1\}^v$. The hash function 415-a may output a spine value 425-a ($s_1$), which may include a set of coded bits. As described herein, $s_i = h(s_{i-1}, \overline{m}_i)$. In addition, the spine value 425-a and a set of k bits 410-b may be input into a hash function 415-b, which may output a spine value 425-b ($s_2$). The spine value 425-b and a set of k bits 410-c may be input into a hash function 415-c, which may output a spine value 425-c ($s_3$), and so on. As such, the transmitter device may sequentially hash together groups of k bits.

In addition, the spine values corresponding to the spine values 425 may be used as a seed to a respective RNG 420, where RNG: $\{0, 1\}^v \times N \rightarrow \{0, 1\}^c$. For example, the spine value 425-a may be a seed for an RNG 420-a, which may generate random numbers $x_{1,1}$ (for Pass 1), $x_{1,2}$ (for Pass 2), and $x_{1,3}$ (for Pass 3). In addition, the spine value 425-b may be a seed for an RNG 420-b, which may generate random numbers $x_{2,1}$ (for Pass 1), $x_{2,2}$ (for Pass 2), and $x_{2,3}$ (for Pass 3), and the spine value 425-*c* may be a seed for an RNG 420-*c*, which may generate random numbers $x_{3,1}$ (for Pass 1), $x_{3,2}$ (for Pass 2), and $x_{3,3}$ (for Pass 3). In some examples, the transmitter device may combine a hash function 415 and a respective RNG 420 into a single or same process. In this way, the spines 310 may encode the message 405.

The random numbers output by the RNGs 420 may be converted to constellation symbols used to map the sets of bits 410 to symbols of the message 405. That is, the transmitter device may use the values output from an RNG 420 and an IQ constellation function mapping to generate the transmitted symbol. In such cases, the transmitter device may not use gray code to differentiate between two neighbor symbols (as the receiver device performs joint decoding over all received symbols). If b represents a c-bit output from an RNG 420, the transmitter device may generate I and Q under an average power constraint, P. The average power constraint may be a uniform power constraint and a truncated Gaussian power constraint, among other power constraints.

To achieve higher code rates without increasing decoding costs, the transmitter device 205 may utilize a puncturing scheme to puncture the transmitted symbols. The transmission itself may utilize any constellation (e.g., QAM, non-square, Gaussian). In some examples, the transmitter device may puncture the transmitted symbols to achieve a higher and finer rate without increasing decoding costs. The transmitter device may determine the puncturing scheme based on the k values in each set of k bits 410. In this way, rather than transmitting one symbol per spine, per pass, the transmitter device may skip some spine values 425, and if used by the receiver device, may transmit them again (e.g., retransmit only the skipped spines) within one or more sub-passes before starting a new pass. The puncturing scheme may be known to both the transmitter and the receiver.

In an example, an initial rate may be 8k bits per channel use. In each sub-pass, the transmitter device may transmit symbols for some spine values 425, while some other symbols may have been previously transmitted. Selecting a combination of transmitted symbols may dictate a rate granularity. In some examples, n=256, k=4, and n/k=64. During a first pass (Pass 1), the transmitter device may transmit 1:2 symbols (over all 32 symbols), and for a second pass (Pass 2) the transmitter device may transmit one symbol starting from an end of a spine vector (such that the transmission is wrapped around). In such cases, the transmitter device may start at the rate of 8 bits per channel use and decrease the rate over time, where a total quantity of transmitted symbols per pass may dictate an effective rate granularity.

Because of the puncturing scheme, the transmitter device may be bound by a maximal working rate that the decoder may successfully decode. Alternatively, to increase an instantaneous rate without and decoder loss or increased complexity, the transmitter device may transmit complex symbols per spine or transmit real and imaginary components of the symbols per spine, thus the effective instantaneous rate may double for a same constellation mapping.

The receiver device may use a reduced complexity machine learning model approach to decoding the transmitted symbols (e.g., a bubble decoder). For example, the decoding process may include a joint-demod-decode process, where the receiver device 210 may skip a de-mapper block process (e.g., a log-likelihood ratio (LLR) computation). Using such machine learning decoding techniques, the receiver device 210 may generate all codewords out of size n bits (total $2^n$) and calculate a distance between symbols generated at the receiver device 210 and actual received noisy symbols per codeword. The decoded message may be the one with a minimal distance over all received symbols. For example, given a vector of observations y and an encoder function $\bar{x}(M')$n that yields the vector of transmitted symbols for the message M', the machine learning model may follow $\overline{M} \in \mathrm{argmin} \|\bar{y}-\bar{x}(M')\|^2$, where $M' \in \{0,1\}^n$. If the transmitter device uses the puncturing scheme, the receiver device may refrain from including observations in the calculation.

Because the spinal encoding described herein includes applying a hash functions sequentially, input messages with a common prefix may also have a common spine prefix, and the symbols produced from the shared spine values may be identical. As such, the receiver device 210 may decompose a total distance into a sum over spine values. For example, the receiver device 210 may utilize a vector y divided into sub-vectors $$\bar{y}_i \ldots \bar{y}_{\frac{n}{k}},$$

which may represent the symbols from spine values 425 ($s_i$) of a correct message (as well as for 1(M')). As such, a cost function may become $\|\bar{y}-\bar{x}(M')\|^2 = \|\bar{y}-\bar{x}_i(S_i')\|^2$.

The receiver device may compute the sum once for all message that share a same spine value 425 ($s_i$). Thus, the receiver device may use tree decoding with a root at spine so. Summing branch costs on a path from the root to a node may result in a path cost of the node, equivalent to the cost function described. Using the machine learning techniques, the receiver device may identify a leaf with a lowest cost and return a corresponding complete message.

In some examples, if a first message M* and a second message M' differ in an ith bit, the symbols including and after an index cell i/k may be dissimilar, such that an earlier an error is determined in M', the larger the path cost. As such, differences between the messages may occur in the last O(log n) bits. When the receiver device has computed all path costs for the leaves of the decoding tree, the receiver device may pick the best B leaves and trace them back through the decoding tree. In such cases, the receiver device may expect to find that they converge to a small quantity of common ancestor nodes. Therefore, the receiver device may use a bubble decoder technique for decoding the symbols, with a parameter d indicating a depth and a parameter B indicating a beam width. Using this type of decoding, instead of searching an entire decoding tree, the receiver device may maintain B common ancestors (e.g., a beam) and a partial decoding tree rooted in each ancestor of depth d.

If the transmitter device performs the retransmission of at least a portion of the symbols at a particular stage of the decoding tree (corresponding to a specific symbol or spine), the receiver device may use the previously calculated sub-tree until that stage, thus saving complexity. In this way, the receiver device may maintain retransmission symbols starting from the end of the tree (last symbols). With this information, the receiver device may expand the decoding tree beginning at this point. As the width of the decoding tree may be given by k (e.g., expanding $2^k$ leaves at each stage), the decoding tree width may decrease and decoding stages (n/k) and latency may increase if k is low until a next retransmission is requested. Alternatively, the width of the decoding tree may increase if k is high.

Figure 5:
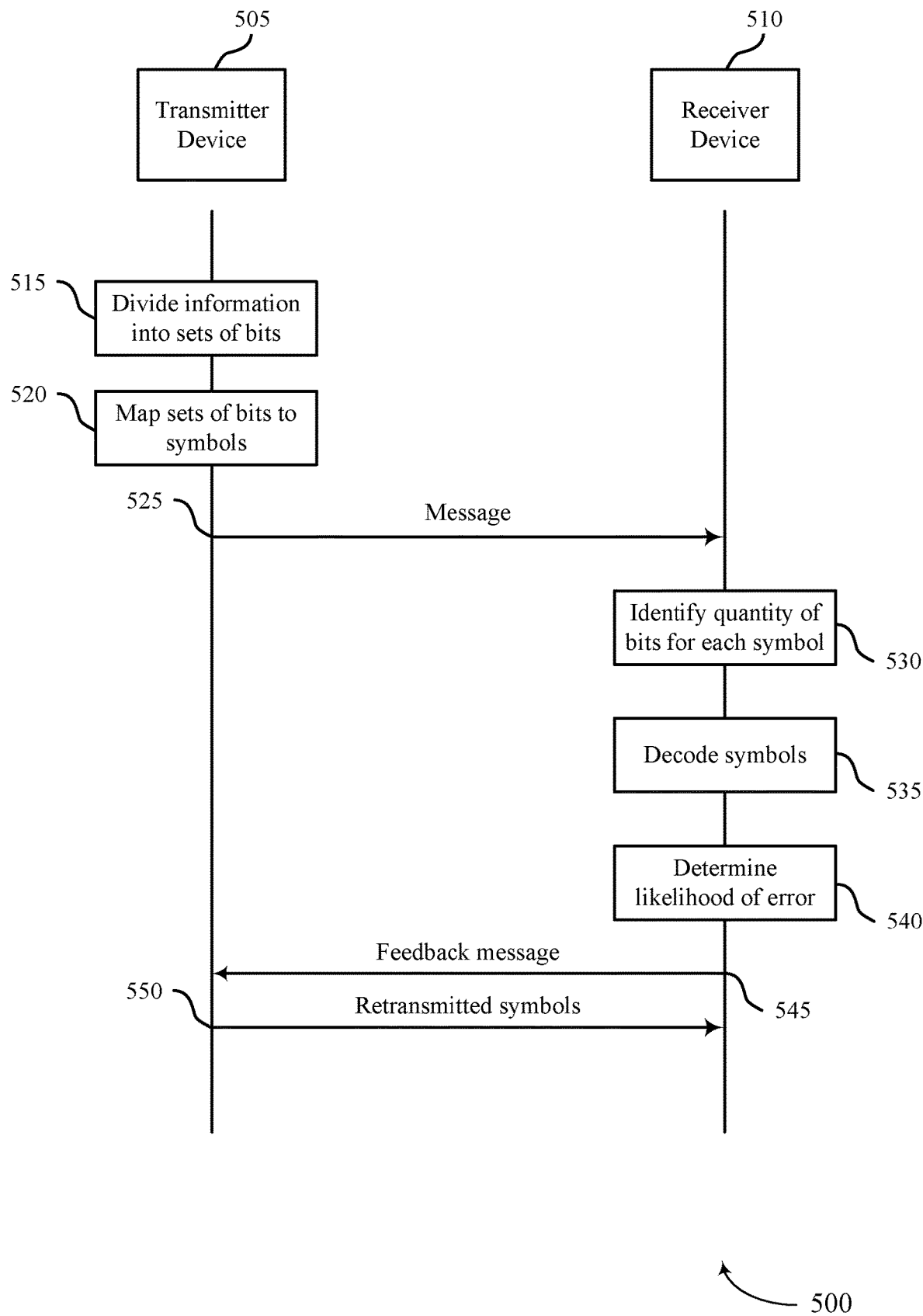
FIG. 5 illustrates an example of a process flow that supports encoding using spinal codes in accordance with one or more aspects of the present disclosure.

FIG. 5 illustrates an example of a process flow 500 that supports encoding using spinal codes in accordance with one or more aspects of the present disclosure. The process flow 500 may implement aspects of wireless communications systems 100 and 200, or may be implemented by aspects of the wireless communications systems 100 and 200. For example, the process flow 500 may illustrate operations between a transmitter device 505 and a receiver device 510, which may be examples of corresponding devices described herein. In the following description of the process flow 500, the operations between the transmitter device 505 and the receiver device 510 may be transmitted in a different order than the example order shown, or the operations performed by the transmitter device 505 and the receiver device 510 may be performed in different orders or at different times. Some operations may also be omitted from the process flow 500, and other operations may be added to the process flow 500.

At 515, the transmitter device 505 may divide information for transmission into sets of bits, each set in a first subset of the sets of bits including a first quantity of bits and each set in a second subset of the sets of bits including a second quantity of bits different than the first quantity of bits. That is, the information may include n bits, and each set of the sets of bits may include k bits, where k is variable.

At 520, the transmitter device 505 may map, based on dividing the information, each set of the sets of bits to a symbol to generate a message including a set of symbols. That is, k bits may be mapped to each symbol such that each symbol is associated with a different quantity of bits. Based on dividing the information and mapping the sets of bits as described herein, the transmitter device 505 may encode the symbols using a spinal code.

At 525, the transmitter device 505 may transmit, to the receiver device 510, a message including the set of symbols, where symbols of the set of symbols are transmitted in a first order based on a second order of sets of bits in information of the message. The second order may be based on the value of k for each of the sets of bits, and the first order may be based on transmitting the symbols in an order from smallest k to largest k (e.g., the smallest sets of bits are transmitted at the beginning of the message and the largest sets of bits are transmitted at the end of the message).

At 530, the receiver device 510 may identify a quantity of bits associated with each symbol of the set of symbols based on receiving the message. That is, the receiver device 510 may identify respective k values for each symbol, for example based on the order in which the receiver device 510 receives the symbols.

At 535, the receiver device 510 may decode the set of symbols based on identifying the quantity of bits. In some cases, the decoding may be based on the set of symbols being encoded using a spinal code, where the receiver device 510 may identify a set of spines associated with the set of symbols and identify the quantity of bits and perform the decoding based on identifying the set of spines.

At 540, the receiver device 510 may identify that a likelihood of an error associated with the message satisfies a threshold based on decoding the set of symbols. For example, the receiver device 510 may fail to successfully decode one or more symbols of the message and determine the likelihood of the error accordingly.

At 545, the receiver device 510 may transmit, to the transmitter device 505, a feedback message based on determining that the likelihood of the error associated with the message satisfies the threshold. In some examples, the feedback message may include ACK/NACK feedback.

At 550, the transmitter device 505 may retransmit, to the receiver device 510, a portion of the set of symbols based on the likelihood of the error associated with the message. For example, the transmitter device 505 may retransmit one or more symbols mapped to sets of bits with relatively larger k values. In some examples, the receiver device may decode the portion of the set of symbols based on identifying the quantity of bits associated with each symbol of the set of symbols in the retransmitted portion.

Figure 6:
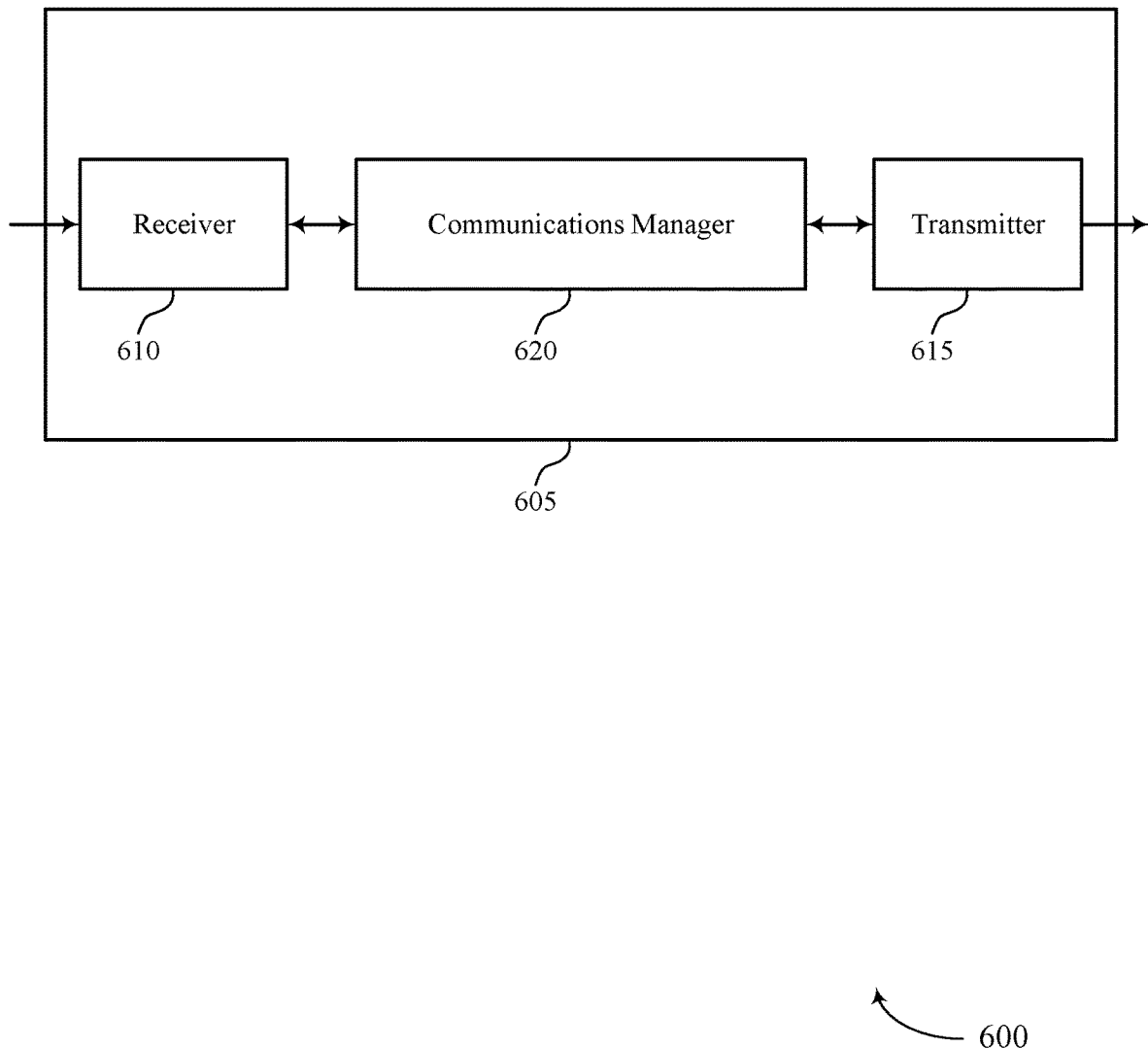
FIGS. 6 and 7 illustrate block diagrams of devices that support encoding using spinal codes in accordance with one or more aspects of the present disclosure.

FIG. 6 illustrates a block diagram 600 of a device 605 that supports encoding using spinal codes in accordance with one or more aspects of the present disclosure. The device 605 may be an example of aspects of a receiver device (e.g., a UE or a network entity) as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to encoding using spinal codes). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to encoding using spinal codes). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of encoding using spinal codes as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a receiver device in accordance with examples as disclosed herein. For example, the communications manager 620 may be configured as or otherwise support a means for receiving a message including a set of symbols encoded using a spinal code, where symbols of the set of symbols are transmitted in a first order based on a second order of sets of bits in information of the message. The communications manager 620 may be configured as or otherwise support a means for identifying a quantity of bits associated with each symbol of the set of symbols based on receiving the message, where a first subset of the set of symbols are associated with a first quantity of bits and a second subset of the set of symbols are associated with a second quantity of bits different than the first quantity of bits. The communications manager 620 may be configured as or otherwise support a means for decoding the set of symbols based on identifying the quantity of bits. The communications manager 620 may be configured as or otherwise support a means for determining that a likelihood of an error associated with the message satisfies a threshold based on decoding the set of symbols. The communications manager 620 may be configured as or otherwise support a means for transmitting a feedback message based on determining that the likelihood of the error associated with the message satisfies the threshold.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for encoding information using spinal coding, which may reduce decoder complexity, improve a coding rate, improve performance, and improve a UEP.

Figure 7:
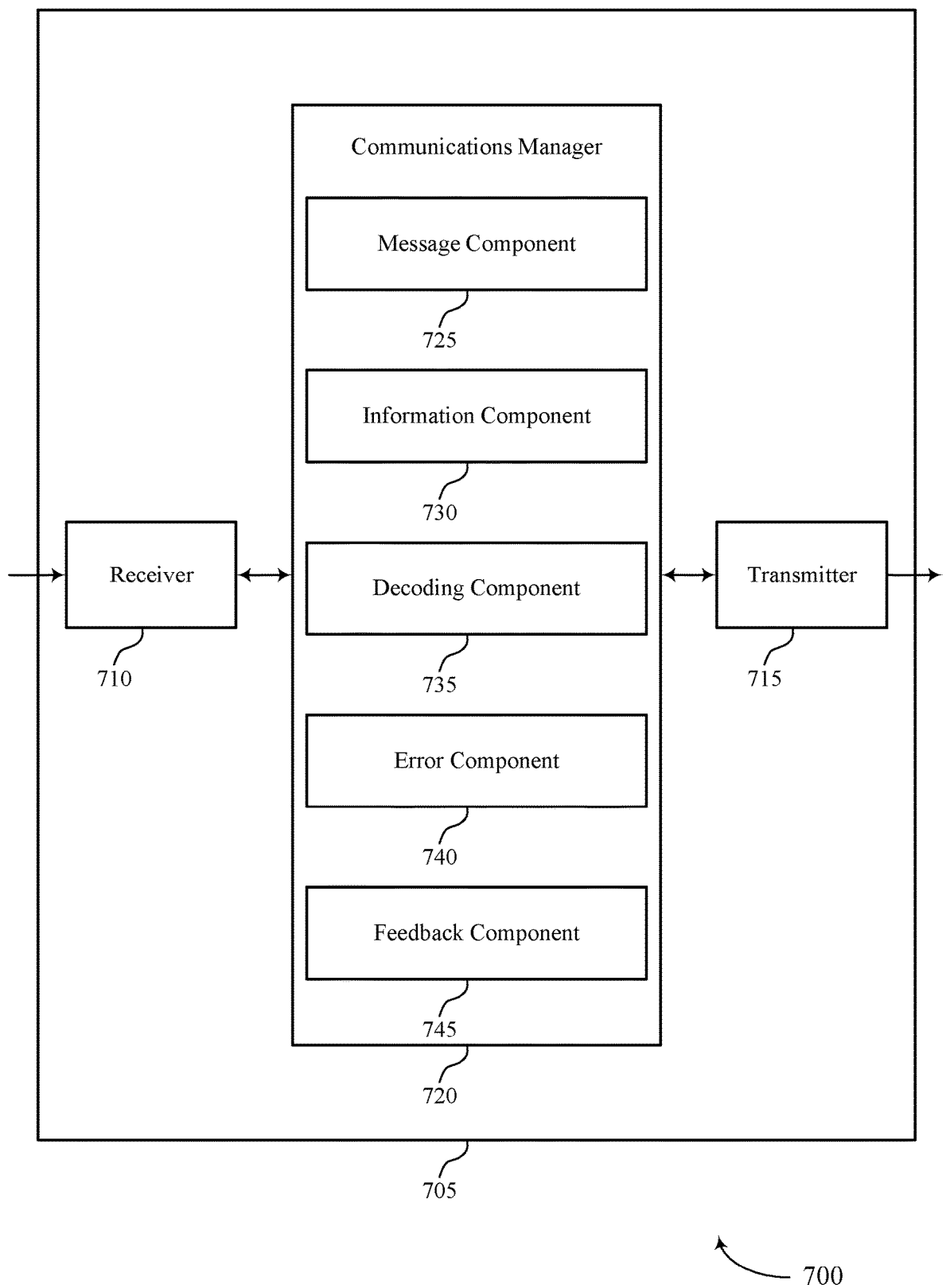

FIG. 7 illustrates a block diagram 700 of a device 705 that supports encoding using spinal codes in accordance with one or more aspects of the present disclosure. The device 705 may be an example of aspects of a device 605 or a receiver device as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to encoding using spinal codes). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to encoding using spinal codes). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of encoding using spinal codes as described herein. For example, the communications manager 720 may include a message component 725, an information component 730, a decoding component 735, an error component 740, a feedback component 745, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a receiver device in accordance with examples as disclosed herein. The message component 725 may be configured as or otherwise support a means for receiving a message including a set of symbols encoded using a spinal code, where symbols of the set of symbols are transmitted in a first order based on a second order of sets of bits in information of the message. The information component 730 may be configured as or otherwise support a means for identifying a quantity of bits associated with each symbol of the set of symbols based on receiving the message, where a first subset of the set of symbols are associated with a first quantity of bits and a second subset of the set of symbols are associated with a second quantity of bits different than the first quantity of bits. The decoding component 735 may be configured as or otherwise support a means for decoding the set of symbols based on identifying the quantity of bits. The error component 740 may be configured as or otherwise support a means for determining that a likelihood of an error associated with the message satisfies a threshold based on decoding the set of symbols. The feedback component 745 may be configured as or otherwise support a means for transmitting a feedback message based on determining that the likelihood of the error associated with the message satisfies the threshold.

Figure 8:
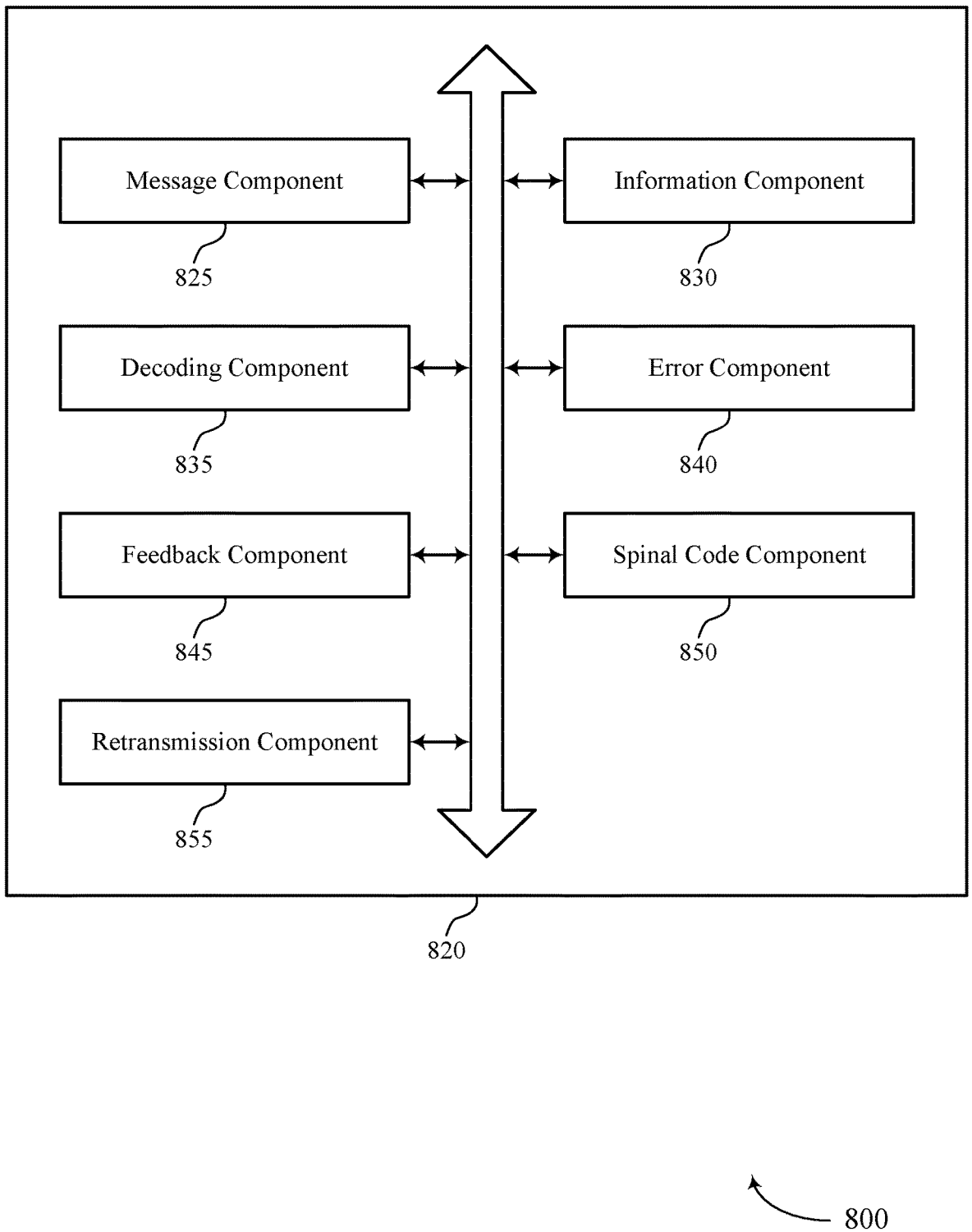
FIG. 8 illustrates a block diagram of a communications manager that supports encoding using spinal codes in accordance with one or more aspects of the present disclosure.

FIG. 8 illustrates a block diagram 800 of a communications manager 820 that supports encoding using spinal codes in accordance with one or more aspects of the present disclosure. The communications manager 820 may be an example of aspects of a communications manager 620, a communications manager 720, or both, as described herein. The communications manager 820, or various components thereof, may be an example of means for performing various aspects of encoding using spinal codes as described herein. For example, the communications manager 820 may include a message component 825, an information component 830, a decoding component 835, an error component 840, a feedback component 845, a spinal code component 850, a retransmission component 855, or any combination thereof. Each of these components may communicate, directly or indirectly, with one another (e.g., via one or more buses).

The communications manager 820 may support wireless communication at a receiver device in accordance with examples as disclosed herein. The message component 825 may be configured as or otherwise support a means for receiving a message including a set of symbols encoded using a spinal code, where symbols of the set of symbols are transmitted in a first order based on a second order of sets of bits in information of the message. The information component 830 may be configured as or otherwise support a means for identifying a quantity of bits associated with each symbol of the set of symbols based on receiving the message, where a first subset of the set of symbols are associated with a first quantity of bits and a second subset of the set of symbols are associated with a second quantity of bits different than the first quantity of bits. The decoding component 835 may be configured as or otherwise support a means for decoding the set of symbols based on identifying the quantity of bits. The error component 840 may be configured as or otherwise support a means for determining that a likelihood of an error associated with the message satisfies a threshold based on decoding the set of symbols. The feedback component 845 may be configured as or otherwise support a means for transmitting a feedback message based on determining that the likelihood of the error associated with the message satisfies the threshold.

In some examples, to support decoding the set of symbols, the spinal code component 850 may be configured as or otherwise support a means for identifying a set of spines associated with the set of symbols based on the set of symbols being encoded using the spinal code, where identifying the quantity of bits is based on identifying the set of spines.

In some examples, the retransmission component 855 may be configured as or otherwise support a means for receiving a retransmission of a portion of the set of symbols based on transmitting the feedback message.

In some examples, the retransmission component 855 may be configured as or otherwise support a means for decoding the portion of the set of symbols based on identifying the quantity of bits associated with each symbol of the set of symbols.

In some examples, the decoding component 835 may be configured as or otherwise support a means for determining at least a partial codeword based on decoding the set of symbols.

In some examples, the first quantity of bits and the second quantity of bits are based on an average codeword size constraint. In some examples, the feedback message indicates a first symbol of the set of symbols that is associated with the likelihood of the error.

Figure 9:
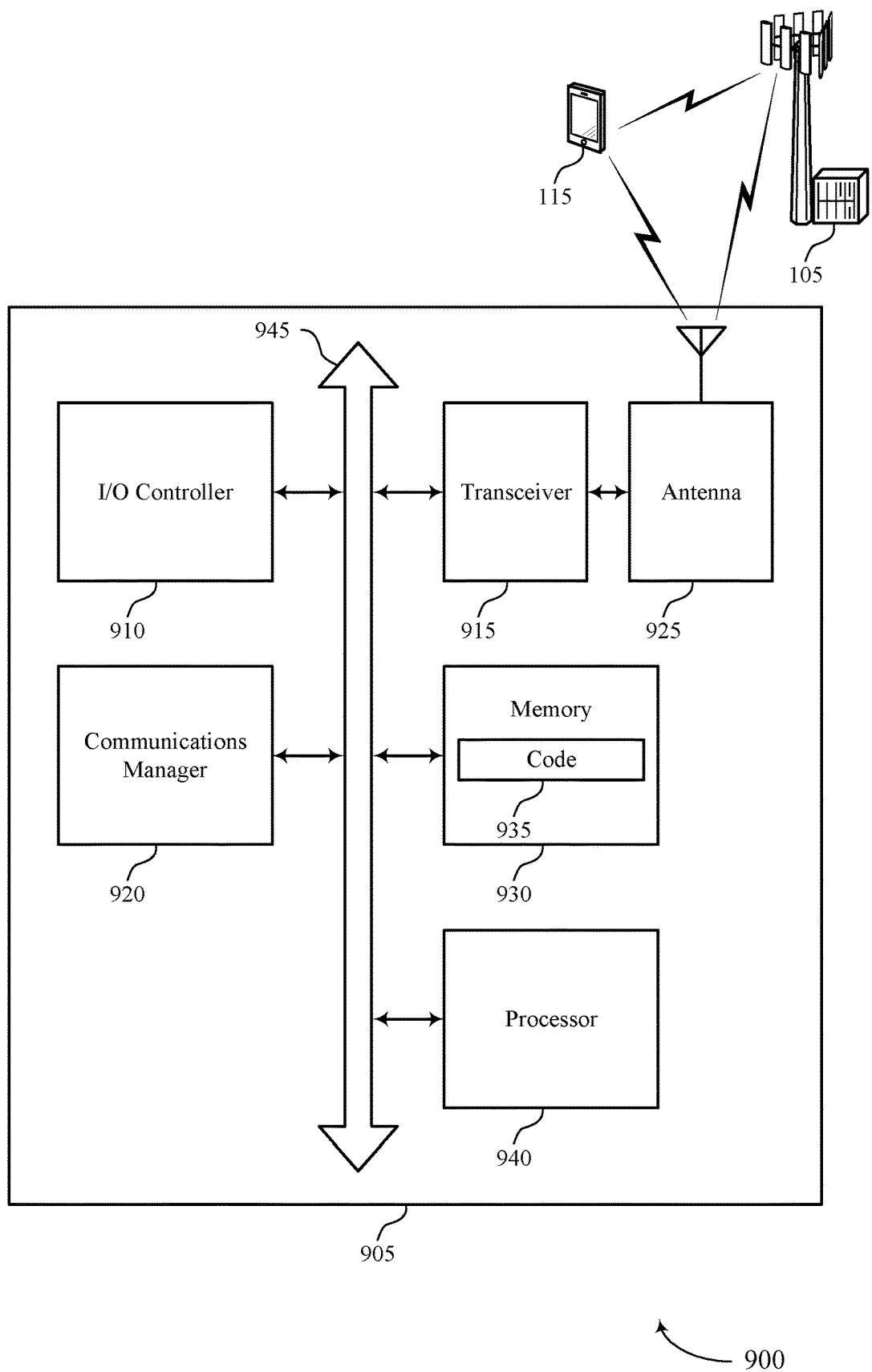
FIG. 9 illustrates a diagram of a system including a device that supports encoding using spinal codes in accordance with one or more aspects of the present disclosure.

FIG. 9 illustrates a diagram of a system 900 including a device 905 that supports encoding using spinal codes in accordance with one or more aspects of the present disclosure. The device 905 may be an example of or include the components of a device 605, a device 705, or a receiver device as described herein (e.g., a UE or a network entity). The device 905 may include components for bi-directional voice and data communications including components for transmitting and receiving communications, such as a communications manager 920, an I/O controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include RAM and ROM. The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a BIOS which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting encoding using spinal codes). For example, the device 905 or a component of the device 905 may include a processor 940 and memory 930 coupled with or to the processor 940, the processor 940 and memory 930 configured to perform various functions described herein.

The communications manager 920 may support wireless communication at a receiver device in accordance with examples as disclosed herein. For example, the communications manager 920 may be configured as or otherwise support a means for receiving a message including a set of symbols encoded using a spinal code, where symbols of the set of symbols are transmitted in a first order based on a second order of sets of bits in information of the message. The communications manager 920 may be configured as or otherwise support a means for identifying a quantity of bits associated with each symbol of the set of symbols based on receiving the message, where a first subset of the set of symbols are associated with a first quantity of bits and a second subset of the set of symbols are associated with a second quantity of bits different than the first quantity of bits. The communications manager 920 may be configured as or otherwise support a means for decoding the set of symbols based on identifying the quantity of bits. The communications manager 920 may be configured as or otherwise support a means for determining that a likelihood of an error associated with the message satisfies a threshold based on decoding the set of symbols. The communications manager 920 may be configured as or otherwise support a means for transmitting a feedback message based on determining that the likelihood of the error associated with the message satisfies the threshold.

By including or configuring the communications manager 920 in accordance with examples as described herein, the device 905 may support techniques for encoding information using spinal coding, which may reduce decoder complexity, improve a coding rate, improve performance, and improve a UEP.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of encoding using spinal codes as described herein, or the processor 940 and the memory 930 may be otherwise configured to perform or support such operations.

Figure 10:
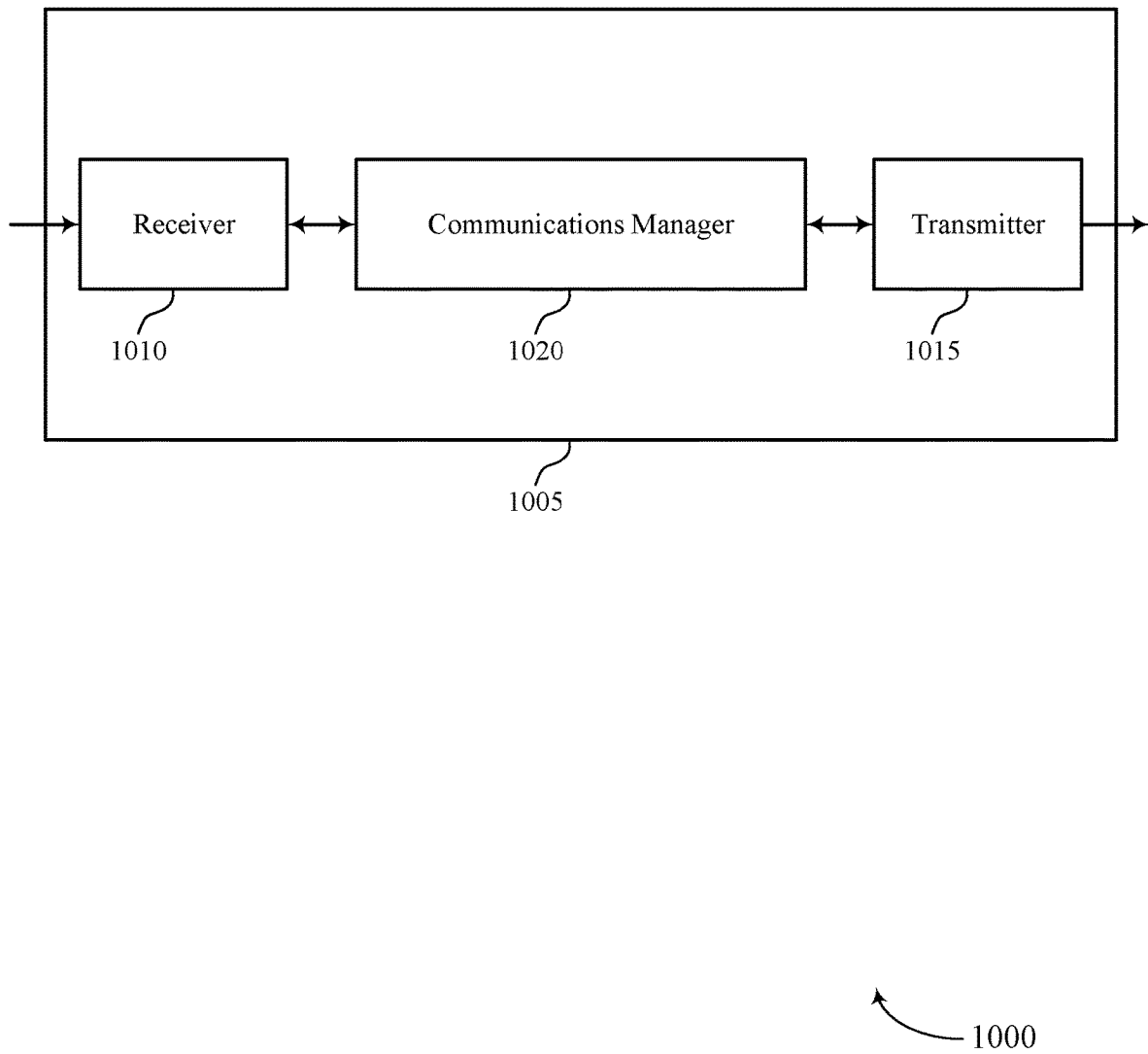
FIGS. 10 and 11 illustrate block diagrams of devices that support encoding using spinal codes in accordance with one or more aspects of the present disclosure.

FIG. 10 illustrates a block diagram 1000 of a device 1005 that supports encoding using spinal codes in accordance with one or more aspects of the present disclosure. The device 1005 may be an example of aspects of a transmitter device (e.g., a UE or a network entity) as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of encoding using spinal codes as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a transmitter device in accordance with examples as disclosed herein. For example, the communications manager 1020 may be configured as or otherwise support a means for dividing information for transmission into sets of bits, each set in a first subset of the sets of bits including a first quantity of bits and each set in a second subset of the sets of bits including a second quantity of bits different than the first quantity of bits. The communications manager 1020 may be configured as or otherwise support a means for mapping, based at least in part on dividing the information, each set of the sets of bits to a symbol to generate a message including a set of symbols. The communications manager 1020 may be configured as or otherwise support a means for transmitting the message including the set of symbols based on the mapping, where symbols of the set of symbols are transmitted in a first order based on a second order of the sets of bits in the information. The communications manager 1020 may be configured as or otherwise support a means for retransmitting a portion of the set of symbols based on a likelihood of error associated with the message.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for encoding information using spinal coding, which may reduce decoder complexity, improve a coding rate, improve performance, and improve a UEP.

Figure 11:
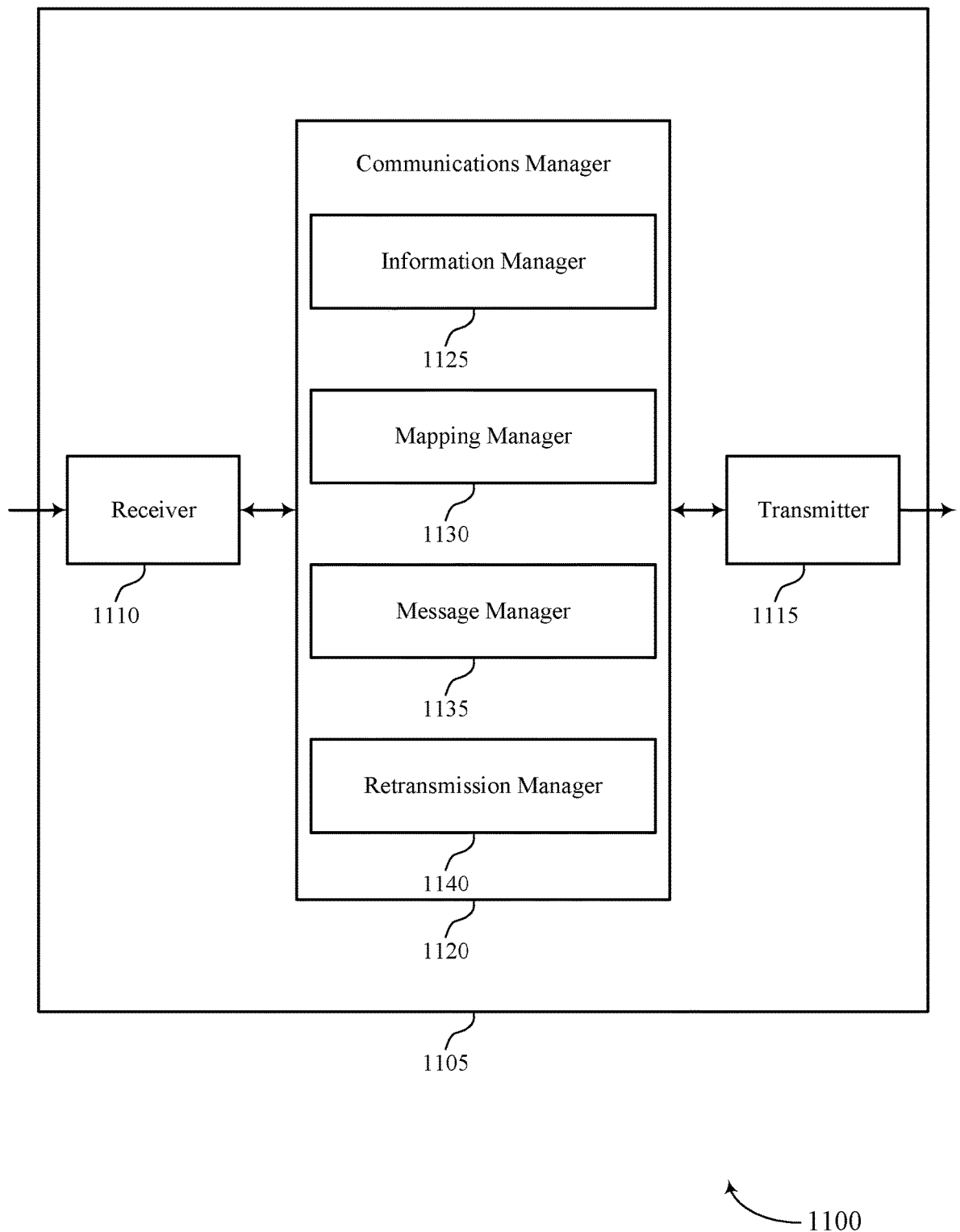

FIG. 11 illustrates a block diagram 1100 of a device 1105 that supports encoding using spinal codes in accordance with one or more aspects of the present disclosure. The device 1105 may be an example of aspects of a device 1005 or a transmitter device as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of encoding using spinal codes as described herein. For example, the communications manager 1120 may include an information manager 1125, a mapping manager 1130, a message manager 1135, a retransmission manager 1140, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a transmitter device in accordance with examples as disclosed herein. The information manager 1125 may be configured as or otherwise support a means for dividing information for transmission into sets of bits, each set in a first subset of the sets of bits including a first quantity of bits and each set in a second subset of the sets of bits including a second quantity of bits different than the first quantity of bits. The mapping manager 1130 may be configured as or otherwise support a means for mapping, based on dividing the information, each set of the sets of bits to a symbol to generate a message including a set of symbols. The message manager 1135 may be configured as or otherwise support a means for transmitting the message including the set of symbols based on the mapping, where symbols of the set of symbols are transmitted in a first order based on a second order of the sets of bits in the information. The retransmission manager 1140 may be configured as or otherwise support a means for retransmitting a portion of the set of symbols based on a likelihood of error associated with the message.

Figure 12:
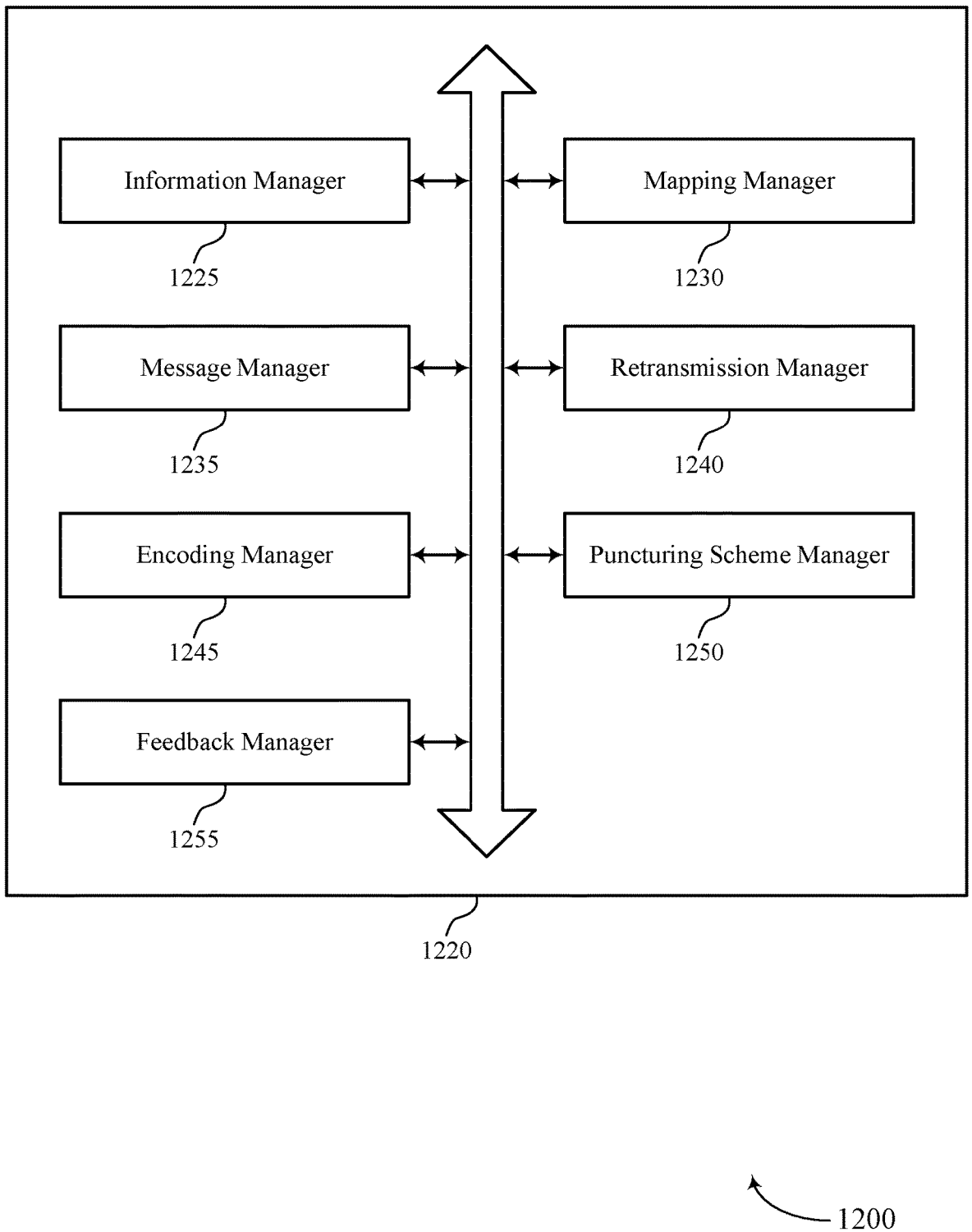
FIG. 12 illustrates a block diagram of a communications manager that supports encoding using spinal codes in accordance with one or more aspects of the present disclosure.

FIG. 12 illustrates a block diagram 1200 of a communications manager 1220 that supports encoding using spinal codes in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of encoding using spinal codes as described herein. For example, the communications manager 1220 may include an information manager 1225, a mapping manager 1230, a message manager 1235, a retransmission manager 1240, an encoding manager 1245, a puncturing scheme manager 1250, a feedback manager 1255, or any combination thereof. Each of these components may communicate, directly or indirectly, with one another (e.g., via one or more buses).

The communications manager 1220 may support wireless communication at a transmitter device in accordance with examples as disclosed herein. The information manager 1225 may be configured as or otherwise support a means for dividing information for transmission into sets of bits, each set in a first subset of the sets of bits including a first quantity of bits and each set in a second subset of the sets of bits including a second quantity of bits different than the first quantity of bits. The mapping manager 1230 may be configured as or otherwise support a means for mapping, based on dividing the information, each set of the sets of bits to a symbol to generate a message including a set of symbols. The message manager 1235 may be configured as or otherwise support a means for transmitting the message including the set of symbols based on the mapping, where symbols of the set of symbols are transmitted in a first order based on a second order of the sets of bits in the information. The retransmission manager 1240 may be configured as or otherwise support a means for retransmitting a portion of the set of symbols based on a likelihood of error associated with the message.

In some examples, the encoding manager 1245 may be configured as or otherwise support a means for encoding the set of symbols using a spinal code based on hashing each set of the sets of bits and a spine of a set of spines associated with the spinal code. In some examples, the mapping manager 1230 may be configured as or otherwise support a means for mapping each set of the sets of bits to the symbol based on the spinal code.

In some examples, the puncturing scheme manager 1250 may be configured as or otherwise support a means for identifying the portion of the set of symbols for retransmission based on a puncturing scheme associated with the message, where retransmitting the portion of the set of symbols is based on the identifying.

In some examples, the puncturing scheme manager 1250 may be configured as or otherwise support a means for determining the puncturing scheme based on the first quantity of bits and the second quantity of bits. In some examples, mapping each set of the sets of bits to the symbol is based on a spinal code associated with the message.

In some examples, the feedback manager 1255 may be configured as or otherwise support a means for receiving a feedback message indicating the error associated with the message, where retransmitting the portion is based on receiving the feedback message.

In some examples, the information manager 1225 may be configured as or otherwise support a means for identifying the first quantity of bits for each set of the first subset and the second quantity of bits for each set of the second subset based on an average codeword size constraint.

Figure 13:
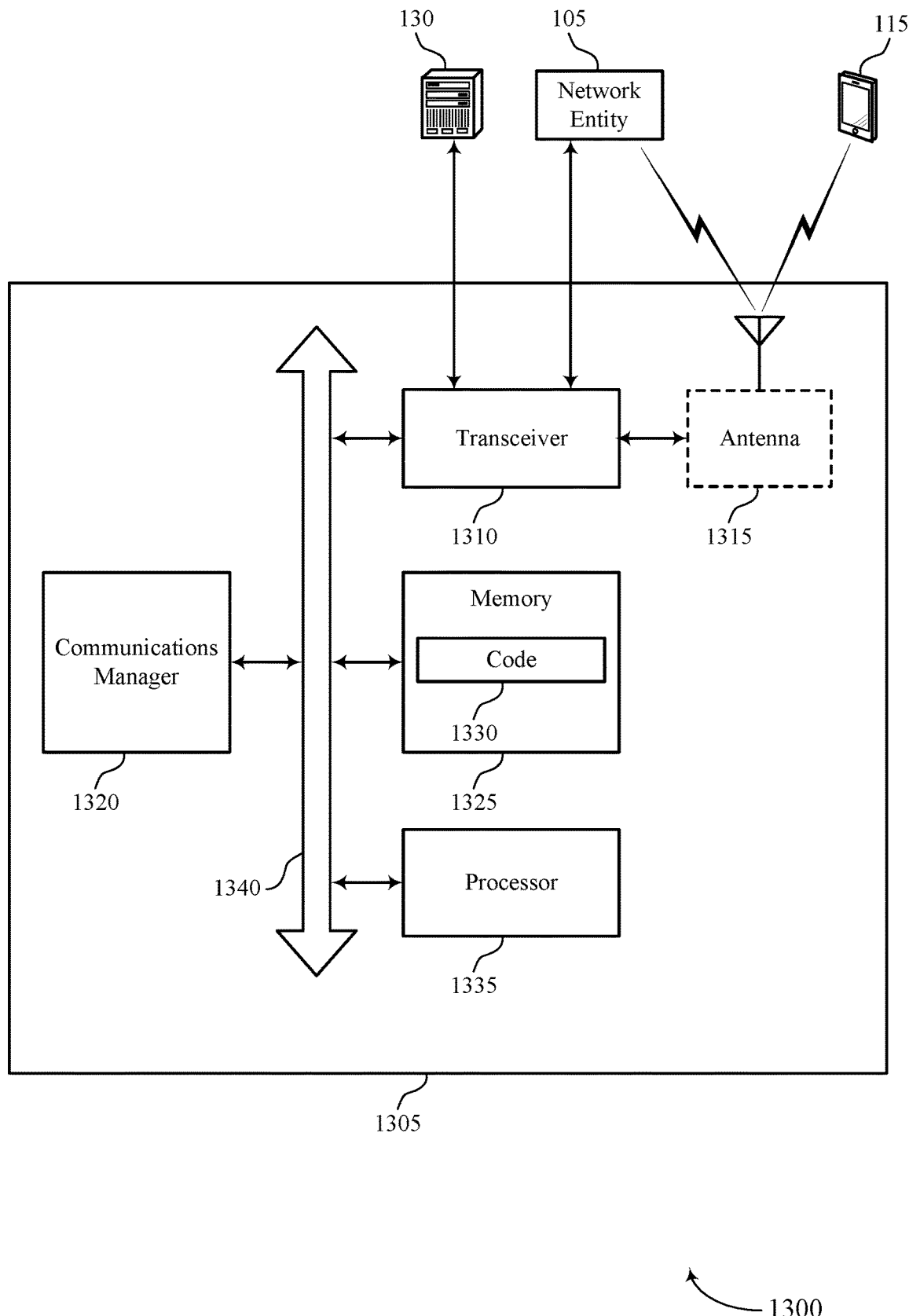
FIG. 13 illustrates a diagram of a system including a device that supports encoding using spinal codes in accordance with one or more aspects of the present disclosure.

FIG. 13 illustrates a diagram of a system 1300 including a device 1305 that supports encoding using spinal codes in accordance with one or more aspects of the present disclosure. The device 1305 may be an example of or include the components of a device 1005, a device 1105, or a transmitter device as described herein (e.g., a UE or a network entity). The device 1305 may include components for bi-directional voice and data communications including components for transmitting and receiving communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting encoding using spinal codes). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a transmitter device in accordance with examples as disclosed herein. For example, the communications manager 1320 may be configured as or otherwise support a means for dividing information for transmission into sets of bits, each set in a first subset of the sets of bits including a first quantity of bits and each set in a second subset of the sets of bits including a second quantity of bits different than the first quantity of bits. The communications manager 1320 may be configured as or otherwise support a means for mapping, based at least in part on dividing the information, each set of the sets of bits to a symbol to generate a message including a set of symbols. The communications manager 1320 may be configured as or otherwise support a means for transmitting the message including the set of symbols based on the mapping, where symbols of the set of symbols are transmitted in a first order based on a second order of the sets of bits in the information. The communications manager 1320 may be configured as or otherwise support a means for retransmitting a portion of the set of symbols based on a likelihood of error associated with the message.

By including or configuring the communications manager 1320 in accordance with examples as described herein, the device 1305 may support techniques for encoding information using spinal coding, which may reduce decoder complexity, improve a coding rate, improve performance, and improve a UEP.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of encoding using spinal codes as described herein, or the processor 1335 and the memory 1325 may be otherwise configured to perform or support such operations.

Figure 14:
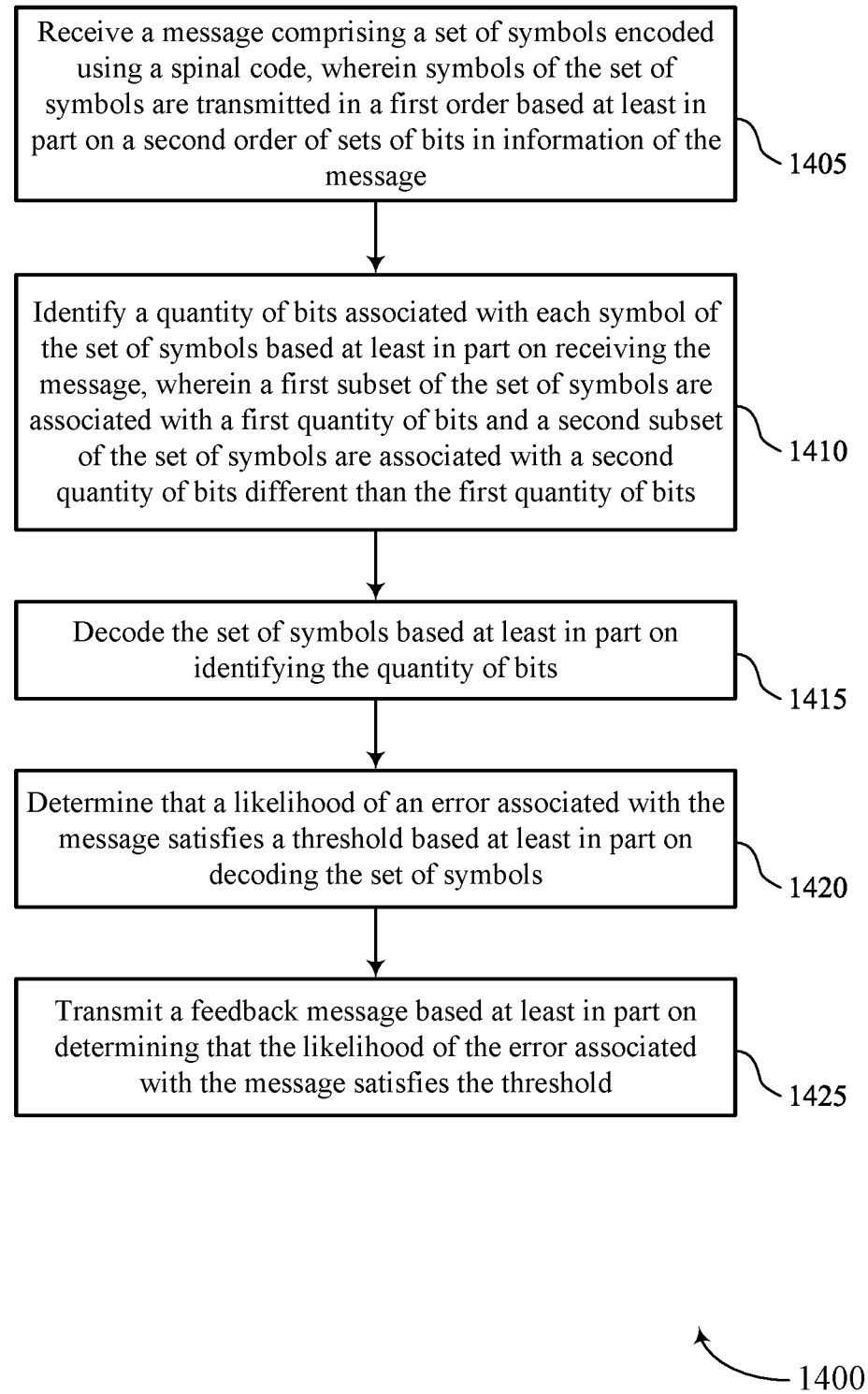
FIGS. 14 through 17 illustrate flowcharts showing methods that support encoding using spinal codes in accordance with one or more aspects of the present disclosure.

FIG. 14 illustrates a flowchart showing a method 1400 that supports encoding using spinal codes in accordance with one or more aspects of the present disclosure. The operations of the method 1400 may be implemented by a receiver device or its components as described herein (e.g., a UE or a network entity). For example, the operations of the method 1400 may be performed by a receiver device as described with reference to FIGS. 1 through 9. In some examples, a receiver device may execute a set of instructions to control the functional elements of the receiver device to perform the described functions. Additionally, or alternatively, the receiver device may perform aspects of the described functions using special-purpose hardware.

At 1405, the method may include receiving a message comprising a set of symbols encoded using a spinal code, wherein symbols of the set of symbols are transmitted in a first order based at least in part on a second order of sets of bits in information of the message. The operations of 1405 may be performed in accordance with examples as disclosed herein, such as the reception of a message 220 of FIG. 2, and/or the transmission of the message of FIG. 5. The message may include information similar to that described with respect to, and illustrated in, FIGS. 3-4. In some examples, aspects of the operations of 1405 may be performed by a message component 825 as described with reference to FIG. 8.

At 1410, the method may include identifying a quantity of bits associated with each symbol of the set of symbols based at least in part on receiving the message, wherein a first subset of the set of symbols are associated with a first quantity of bits and a second subset of the set of symbols are associated with a second quantity of bits different than the first quantity of bits. The operations of 1410 may be performed in accordance with examples as disclosed herein, such as identifying a quantity of bits in a set of symbols 225 of FIG. 2, and/or the n bits of information of FIG. 3, and/or a quantity of bits in a set of k bits of FIG. 4. The quantity of bits may be associated with or similar to that described with respect to, and illustrated in, FIG. 5. In some examples, aspects of the operations of 1410 may be performed by an information component 830 as described with reference to FIG. 8.

At 1415, the method may include decoding the set of symbols based at least in part on identifying the quantity of bits. The operations of 1415 may be performed in accordance with examples as disclosed herein, such as the set of symbols 225 of FIG. 2, and/or the message 405 of FIG. 4. The set of symbols may be associated with or similar to that described with respect to, and illustrated in, FIGS. 3 and 5. In some examples, aspects of the operations of 1415 may be performed by a decoding component 835 as described with reference to FIG. 8.

At 1420, the method may include determining that a likelihood of an error associated with the message satisfies a threshold based at least in part on decoding the set of symbols. The operations of 1420 may be performed in accordance with examples as disclosed herein. The likelihood of the error may include information similar to that described with respect to, and illustrated in, FIGS. 2-5. In some examples, aspects of the operations of 1420 may be performed by an error component 840 as described with reference to FIG. 8.

At 1425, the method may include transmitting a feedback message based at least in part on determining that the likelihood of the error associated with the message satisfies the threshold. The operations of 1425 may be performed in accordance with examples as disclosed herein, such as a feedback message 230 of FIG. 2. The feedback message may include information similar to that described with respect to, and illustrated in, FIGS. 3-5. In some examples, aspects of the operations of 1425 may be performed by a feedback component 845 as described with reference to FIG. 8.

Figure 15:
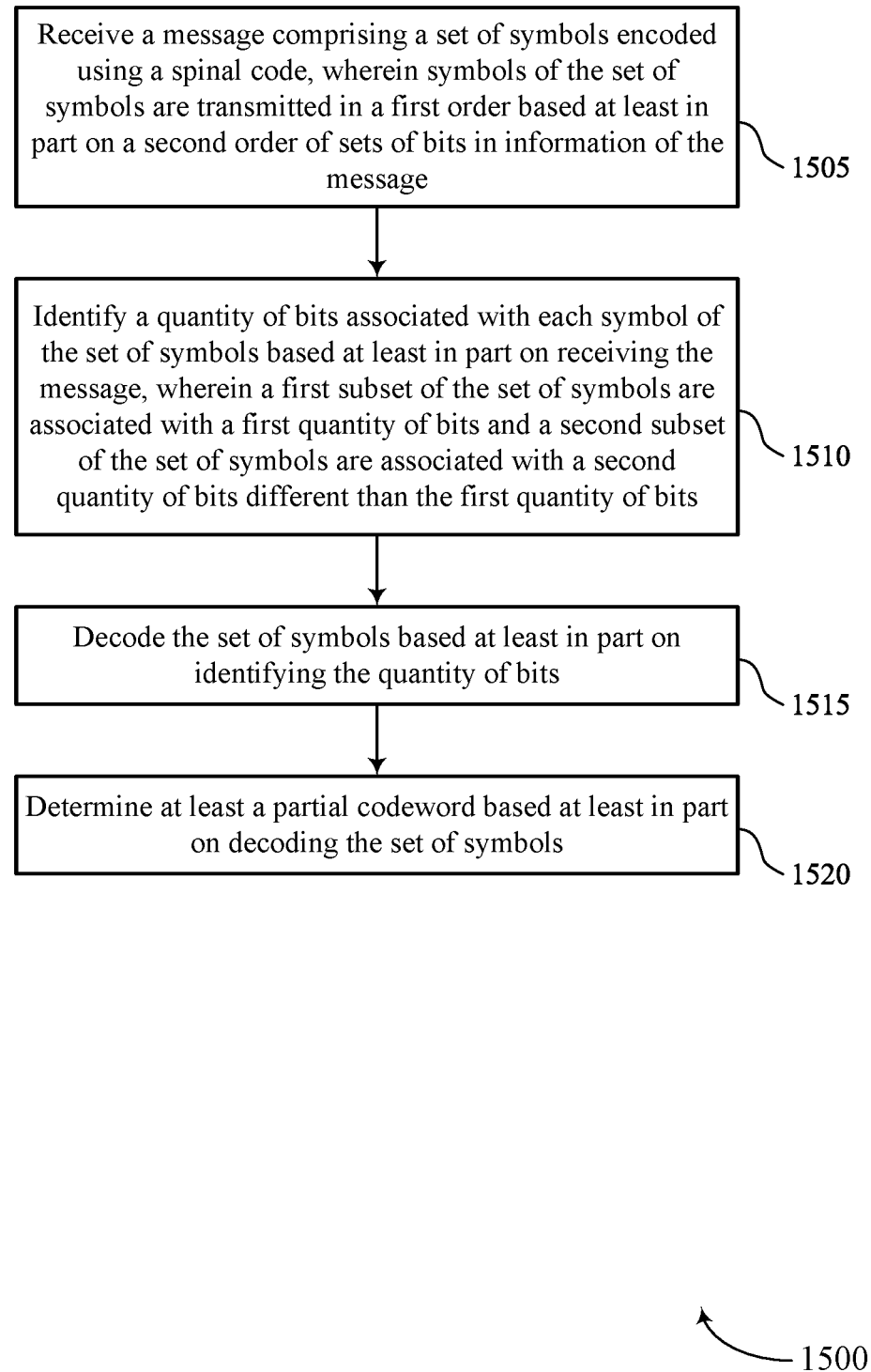

FIG. 15 illustrates a flowchart showing a method 1500 that supports encoding using spinal codes in accordance with one or more aspects of the present disclosure. The operations of the method 1500 may be implemented by a receiver device or its components as described herein (e.g., a UE or a network entity). For example, the operations of the method 1500 may be performed by a receiver device as described with reference to FIGS. 1 through 9. In some examples, a receiver device may execute a set of instructions to control the functional elements of the receiver device to perform the described functions. Additionally, or alternatively, the receiver device may perform aspects of the described functions using special-purpose hardware.

At 1505, the method may include receiving a message comprising a set of symbols encoded using a spinal code, wherein symbols of the set of symbols are transmitted in a first order based at least in part on a second order of sets of bits in information of the message. The operations of 1505 may be performed in accordance with examples as disclosed herein, such as the reception of a message 220 of FIG. 2, and/or the transmission of the message of FIG. 5. The message may include information similar to that described with respect to, and illustrated in, FIGS. 3-4. In some examples, aspects of the operations of 1505 may be performed by a message component 825 as described with reference to FIG. 8.

At 1510, the method may include identifying a quantity of bits associated with each symbol of the set of symbols based at least in part on receiving the message, wherein a first subset of the set of symbols are associated with a first quantity of bits and a second subset of the set of symbols are associated with a second quantity of bits different than the first quantity of bits. The operations of 1510 may be performed in accordance with examples as disclosed herein, such as identifying a quantity of bits in a set of symbols 225 of FIG. 2, and/or the n bits of information of FIG. 3, and/or a quantity of bits in a set of k bits of FIG. 4. The quantity of bits may be associated with or similar to that is described with respect to, and illustrated in, FIG. 5. In some examples, aspects of the operations of 1510 may be performed by an information component 830 as described with reference to FIG. 8.

At 1515, the method may include decoding the set of symbols based at least in part on identifying the quantity of bits. The operations of 1515 may be performed in accordance with examples as disclosed herein, such as the set of symbols 225 of FIG. 2, and/or the message 405 of FIG. 4. The set of symbols may be associated with or similar to that is described with respect to, and illustrated in, FIGS. 3 and 5. In some examples, aspects of the operations of 1515 may be performed by a decoding component 835 as described with reference to FIG. 8.

At 1520, the method may include determining at least a partial codeword based at least in part on decoding the set of symbols. The operations of 1520 may be performed in accordance with examples as disclosed herein. The partial codeword may be associated with or similar to that described with respect to, and illustrated in, FIGS. 2-5. In some examples, aspects of the operations of 1520 may be performed by a decoding component 835 as described with reference to FIG. 8.

Figure 16:
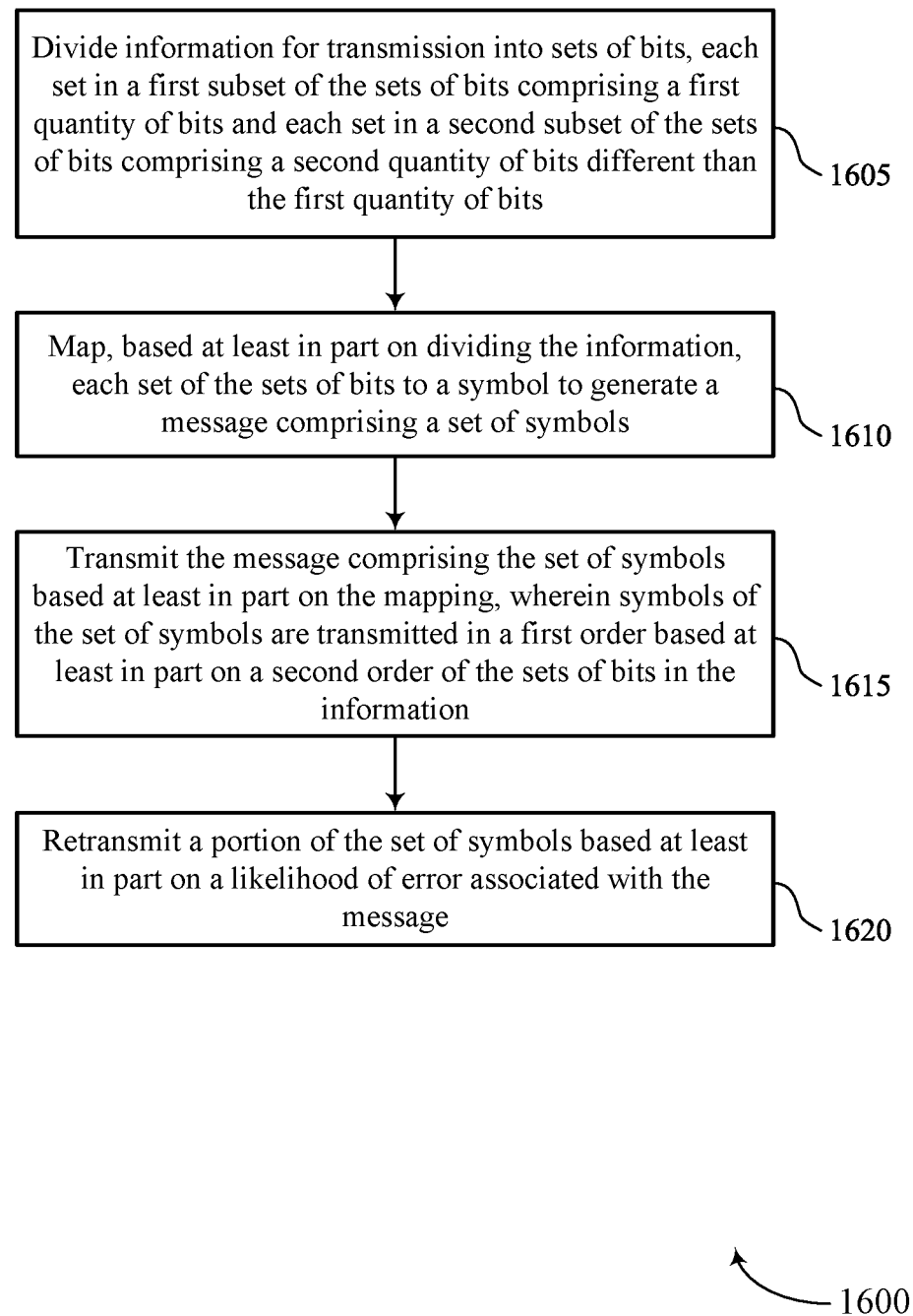

FIG. 16 illustrates a flowchart showing a method 1600 that supports encoding using spinal codes in accordance with one or more aspects of the present disclosure. The operations of the method 1600 may be implemented by a transmitter device or its components as described herein (e.g., a UE or a network entity). For example, the operations of the method 1600 may be performed by a transmitter device as described with reference to FIGS. 1 through 5 and 10 through 13. In some examples, a transmitter device may execute a set of instructions to control the functional elements of the transmitter device to perform the described functions. Additionally, or alternatively, the transmitter device may perform aspects of the described functions using special-purpose hardware.

At 1605, the method may include dividing information for transmission into sets of bits, each set in a first subset of the sets of bits comprising a first quantity of bits and each set in a second subset of the sets of bits comprising a second quantity of bits different than the first quantity of bits. The operations of 1605 may be performed in accordance with examples as disclosed herein, such as a set of symbols 225 of FIG. 2, and/or a set of k bits of FIG. 4. The information may include information similar to that described with respect to, and illustrated in, FIGS. 3 and 5. In some examples, aspects of the operations of 1605 may be performed by an information manager 1225 as described with reference to FIG. 12.

At 1610, the method may include mapping, based at least in part on dividing the information, each set of the sets of bits to a symbol to generate a message comprising a set of symbols. The operations of 1610 may be performed in accordance with examples as disclosed herein, such as a set of symbols 225 of FIG. 2, and/or a set of k bits of FIG. 4. The information may include information similar to that described with respect to, and illustrated in, FIGS. 3 and 5. In some examples, aspects of the operations of 1610 may be performed by a mapping manager 1230 as described with reference to FIG. 12.

At 1615, the method may include transmitting the message comprising the set of symbols based at least in part on the mapping, wherein symbols of the set of symbols are transmitted in a first order based at least in part on a second order of the sets of bits in the information. The operations of 1615 may be performed in accordance with examples as disclosed herein, such as the transmission of a message 220 of FIG. 2, and/or the transmission of the message of FIG. 5. The message may include information similar to that described with respect to, and illustrated in, FIGS. 3-4. In some examples, aspects of the operations of 1615 may be performed by a message manager 1235 as described with reference to FIG. 12.

At 1620, the method may include retransmitting a portion of the set of symbols based at least in part on a likelihood of error associated with the message. The operations of 1620 may be performed in accordance with examples as disclosed herein, such as a retransmission 235 of FIG. 2. The retransmitted portion of the set of symbols may include information similar to that described with respect to, and illustrated in, FIGS. 3-5. In some examples, aspects of the operations of 1620 may be performed by a retransmission manager 1240 as described with reference to FIG. 12.

Figure 17:
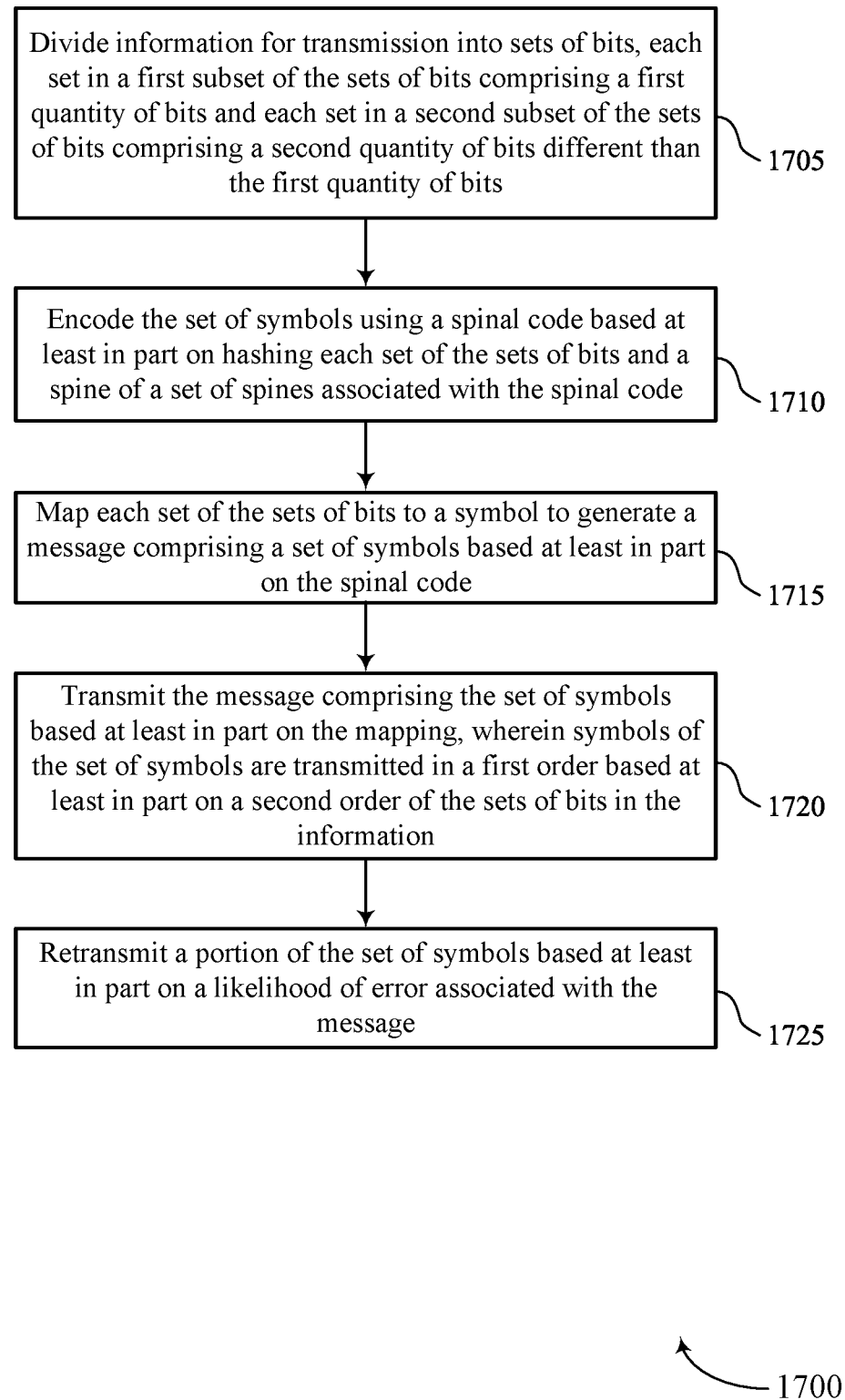

FIG. 17 illustrates a flowchart showing a method 1700 that supports encoding using spinal codes in accordance with one or more aspects of the present disclosure. The operations of the method 1700 may be implemented by a transmitter device or its components as described herein (e.g., a UE or a network entity). For example, the operations of the method 1700 may be performed by a transmitter device as described with reference to FIGS. 1 through 5 and 10 through 13. In some examples, a transmitter device may execute a set of instructions to control the functional elements of the transmitter device to perform the described functions. Additionally, or alternatively, the transmitter device may perform aspects of the described functions using special-purpose hardware.

At 1705, the method may include dividing information for transmission into sets of bits, each set in a first subset of the sets of bits comprising a first quantity of bits and each set in a second subset of the sets of bits comprising a second quantity of bits different than the first quantity of bits. The operations of 1705 may be performed in accordance with examples as disclosed herein, such as a set of symbols 225 of FIG. 2, and/or a set of k bits of FIG. 4. The information may include information similar to that described with respect to, and illustrated in, FIGS. 3 and 5. In some examples, aspects of the operations of 1705 may be performed by an information manager 1225 as described with reference to FIG. 12.

At 1710, the method may include encoding the set of symbols using a spinal code based at least in part on hashing each set of the sets of bits and a spine of a set of spines associated with the spinal code. The operations of 1710 may be performed in accordance with examples as disclosed herein, such as a spine 310 of FIG. 3, and/or a hash function 415 of FIG. 4. The hashing of the sets of bits and the spines may include information similar to that described with respect to, and illustrated in, FIGS. 2 and 5. In some examples, aspects of the operations of 1710 may be performed by an encoding manager 1245 as described with reference to FIG. 12.

At 1715, the method may include mapping each set of the sets of bits to a symbol to generate a message comprising a set of symbols based at least in part on the spinal code. The operations of 1715 may be performed in accordance with examples as disclosed herein, such as a set of symbols 225 of FIG. 2, and/or a set of k bits 410 of FIG. 4. The mapping of each set of the sets of bits may include information similar to that described with respect to, and illustrated in, FIGS. 3 and 5. In some examples, aspects of the operations of 1715 may be performed by a mapping manager 1230 as described with reference to FIG. 12.

At 1720, the method may include transmitting the message comprising the set of symbols based at least in part on the mapping, wherein symbols of the set of symbols are transmitted in a first order based at least in part on a second order of the sets of bits in the information. The operations of 1720 may be performed in accordance with examples as disclosed herein, such as the transmission of a message 220 of FIG. 2, and/or the transmission of the message of FIG. 5. The message may include information similar to that described with respect to, and illustrated in, FIGS. 3-4. In some examples, aspects of the operations of 1720 may be performed by a message manager 1235 as described with reference to FIG. 12.

At 1725, the method may include retransmitting a portion of the set of symbols based at least in part on a likelihood of error associated with the message. The operations of 1725 may be performed in accordance with examples as disclosed herein, such as a retransmission 235 of FIG. 2. The retransmitted portion of the set of symbols may include information similar to that described with respect to, and illustrated in, FIGS. 3-5. In some examples, aspects of the operations of 1725 may be performed by a retransmission manager 1240 as described with reference to FIG. 12.

The following provides an overview of aspects of the present disclosure:

Aspect 1: A method for wireless communication at a receiver device, comprising: receiving a message comprising a set of symbols encoded using a spinal code, wherein symbols of the set of symbols are transmitted in a first order based at least in part on a second order of sets of bits in information of the message; identifying a quantity of bits associated with each symbol of the set of symbols based at least in part on receiving the message, wherein a first subset of the set of symbols are associated with a first quantity of bits and a second subset of the set of symbols are associated with a second quantity of bits different than the first quantity of bits; decoding the set of symbols based at least in part on identifying the quantity of bits; determining that a likelihood of an error associated with the message satisfies a threshold based at least in part on decoding the set of symbols; and transmitting a feedback message based at least in part on determining that the likelihood of the error associated with the message satisfies the threshold.

Aspect 2: The method of aspect 1, wherein decoding the set of symbols comprises: identifying a set of spines associated with the set of symbols based at least in part on the set of symbols being encoded using the spinal code, wherein identifying the quantity of bits is based at least in part on identifying the set of spines.

Aspect 3: The method of any of aspects 1 through 2, further comprising: receiving a retransmission of a portion of the set of symbols based at least in part on transmitting the feedback message.

Aspect 4: The method of aspect 3, further comprising: decoding the portion of the set of symbols based at least in part on identifying the quantity of bits associated with each symbol of the set of symbols.

Aspect 5: The method of any of aspects 1 through 4, further comprising: determining at least a partial codeword based at least in part on decoding the set of symbols.

Aspect 6: The method of any of aspects 1 through 5, wherein the first quantity of bits and the second quantity of bits are based at least in part on an average codeword size constraint.

Aspect 7: The method of any of aspects 1 through 6, wherein the feedback message indicates a first symbol of the set of symbols that is associated with the likelihood of the error.

Aspect 8: A method for wireless communication at a transmitter device, comprising: dividing information for transmission into sets of bits, each set in a first subset of the sets of bits comprising a first quantity of bits and each set in a second subset of the sets of bits comprising a second quantity of bits different than the first quantity of bits; mapping, based at least in part on dividing the information, each set of the sets of bits to a symbol to generate a message comprising a set of symbols; transmitting the message comprising the set of symbols based at least in part on the mapping, wherein symbols of the set of symbols are transmitted in a first order based at least in part on a second order of the sets of bits in the information; and retransmitting a portion of the set of symbols based at least in part on a likelihood of error associated with the message.

Aspect 9: The method of aspect 8, further comprising: encoding the set of symbols using a spinal code based at least in part on hashing each set of the sets of bits and a spine of a set of spines associated with the spinal code; and mapping each set of the sets of bits to the symbol based at least in part on the spinal code.

Aspect 10: The method of any of aspects 8 through 9, further comprising: identifying the portion of the set of symbols for retransmission based at least in part on a puncturing scheme associated with the message, wherein retransmitting the portion of the set of symbols is based at least in part on the identifying.

Aspect 11: The method of aspect 10, further comprising: determining the puncturing scheme based at least in part on the first quantity of bits and the second quantity of bits.

Aspect 12: The method of any of aspects 8 through 11, wherein mapping each set of the sets of bits to the symbol is based at least in part on a spinal code associated with the message.

Aspect 13: The method of any of aspects 8 through 12, further comprising: receiving a feedback message indicating the error associated with the message, wherein retransmitting the portion is based at least in part on receiving the feedback message.

Aspect 14: The method of any of aspects 8 through 13, further comprising: identifying the first quantity of bits for each set of the first subset and the second quantity of bits for each set of the second subset based at least in part on an average codeword size constraint.

Aspect 15: A receiver device, comprising at least one memory; and at least one processor communicatively coupled with the at least one memory, the at least one processor operable to cause the receiver device to perform a method of any of aspects 1 through 7.

Aspect 16: An apparatus for wireless communication at a receiver device, comprising at least one means for performing a method of any of aspects 1 through 7.

Aspect 17: A non-transitory computer-readable medium storing code for wireless communication at a receiver device, the code comprising instructions executable by a processor to perform a method of any of aspects 1 through 7.

Aspect 18: A transmitter device, comprising at least one memory; and at least one processor communicatively coupled with the at least one memory, the at least one processor operable to cause the transmitter device to perform a method of any of aspects 8 through 14.

Aspect 19: An apparatus for wireless communication at a transmitter device, comprising at least one means for performing a method of any of aspects 8 through 14.

Aspect 20: A non-transitory computer-readable medium storing code for wireless communication at a transmitter device, the code comprising instructions executable by a processor to perform a method of any of aspects 8 through 14.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A receiving device, comprising:
   at least one memory; and
   at least one processor communicatively coupled with the at least one memory, the at least one processor operable to cause the receiver device to:
   receive a message comprising a set of symbols encoded using a spinal code, wherein symbols of the set of symbols are transmitted in a first order based at least in part on a second order of sets of bits in information of the message;
   identify a quantity of bits associated with each symbol of the set of symbols based at least in part on receiving the message, wherein a first subset of the set of symbols are associated with a first quantity of bits and a second subset of the set of symbols are associated with a second quantity of bits different than the first quantity of bits;
   decode the set of symbols based at least in part on identifying the quantity of bits;
   determine that a likelihood of an error associated with the message satisfies a threshold based at least in part on decoding the set of symbols; and
   transmit a feedback message based at least in part on determining that the likelihood of the error associated with the message satisfies the threshold.

2. The receiver device of claim 1, wherein, to decode the set of symbols, the at least one processor is operable to cause the receiver device to:
identify a set of spines associated with the set of symbols based at least in part on the set of symbols being encoded using the spinal code, wherein identifying the quantity of bits is based at least in part on identifying the set of spines.

3. The receiver device of claim 1, wherein the at least one processor is operable to cause the receiver device to:
receive a retransmission of a portion of the set of symbols based at least in part on transmitting the feedback message.

4. The receiver device of claim 3, wherein the at least one processor is operable to cause the receiver device to:
decode the portion of the set of symbols based at least in part on identifying the quantity of bits associated with each symbol of the set of symbols.

5. The receiver device of claim 1, wherein the at least one processor is operable to cause the receiver device to:
determine at least a partial codeword based at least in part on decoding the set of symbols.

6. The receiver device of claim 1, wherein the first quantity of bits and the second quantity of bits are based at least in part on an average codeword size constraint.

7. The receiver device of claim 1, wherein the feedback message indicates a first symbol of the set of symbols that is associated with the likelihood of the error.

8. A transmitter device, comprising:
at least one memory; and
at least one processor communicatively coupled with the at least one memory, the at least one processor operable to cause the transmitter device to:
divide information for transmission into sets of bits, each set in a first subset of the sets of bits comprising a first quantity of bits and each set in a second subset of the sets of bits comprising a second quantity of bits different than the first quantity of bits;
mapping, base at least in part on dividing the information, each set of the sets of bits to a symbol to generate a message comprising a set of symbols;
transmit the message comprising the set of symbols based at least in part on the mapping, wherein symbols of the set of symbols are transmitted in a first order based at least in part on a second order of the sets of bits in the information; and
retransmit a portion of the set of symbols based at least in part on a likelihood of error associated with the message.

9. The transmitter device of claim 8, wherein the at least one processor is operable to cause the transmitter device to:
encode the set of symbols using a spinal code based at least in part on hashing each set of the sets of bits and a spine of a set of spines associated with the spinal code; and
map each set of the sets of bits to the symbol based at least in part on the spinal code.

10. The transmitter device of claim 8, wherein the at least one processor is operable to cause the transmitter device to:
identify the portion of the set of symbols for retransmission based at least in part on a puncturing scheme associated with the message, wherein retransmitting the portion of the set of symbols is based at least in part on the identifying.

11. The transmitter device of claim 10, wherein the at least one processor is operable to cause the transmitter device to:
determine the puncturing scheme based at least in part on the first quantity of bits and the second quantity of bits.

12. The transmitter device of claim 8, wherein mapping each set of the sets of bits to the symbol is based at least in part on a spinal code associated with the message.

13. The transmitter device of claim 8, wherein the at least one processor is operable to cause the transmitter device to:
receive a feedback message indicating the error associated with the message, wherein retransmitting the portion is based at least in part on receiving the feedback message.

14. The transmitter device of claim 8, wherein the at least one processor is operable to cause the transmitter device to:
identify the first quantity of bits for each set of the first subset and the second quantity of bits for each set of the second subset based at least in part on an average codeword size constraint.

15. A method for wireless communication at a receiver device, comprising:
receiving a message comprising a set of symbols encoded using a spinal code, wherein symbols of the set of symbols are transmitted in a first order based at least in part on a second order of sets of bits in information of the message;
identifying a quantity of bits associated with each symbol of the set of symbols based at least in part on receiving the message, wherein a first subset of the set of symbols are associated with a first quantity of bits and a second subset of the set of symbols are associated with a second quantity of bits different than the first quantity of bits;
decoding the set of symbols based at least in part on identifying the quantity of bits;
determining that a likelihood of an error associated with the message satisfies a threshold based at least in part on decoding the set of symbols; and
transmitting a feedback message based at least in part on determining that the likelihood of the error associated with the message satisfies the threshold.

16. The method of claim 15, wherein decoding the set of symbols comprises:
identifying a set of spines associated with the set of symbols based at least in part on the set of symbols being encoded using the spinal code, wherein identifying the quantity of bits is based at least in part on identifying the set of spines.

17. The method of claim 15, further comprising:
receiving a retransmission of a portion of the set of symbols based at least in part on transmitting the feedback message.

18. The method of claim 17, further comprising:
decoding the portion of the set of symbols based at least in part on identifying the quantity of bits associated with each symbol of the set of symbols.

19. The method of claim 15, further comprising:
determining at least a partial codeword based at least in part on decoding the set of symbols.

20. The method of claim 15, wherein the first quantity of bits and the second quantity of bits are based at least in part on an average codeword size constraint.

21. The method of claim 15, wherein the feedback message indicates a first symbol of the set of symbols that is associated with the likelihood of the error.

22. A method for wireless communication at a transmitter device, comprising:
- dividing information for transmission into sets of bits, each set in a first subset of the sets of bits comprising a first quantity of bits and each set in a second subset of the sets of bits comprising a second quantity of bits different than the first quantity of bits;
- mapping, based at least in part on dividing the information, each set of the sets of bits to a symbol to generate a message comprising a set of symbols;
- transmitting the message comprising the set of symbols based at least in part on the mapping, wherein symbols of the set of symbols are transmitted in a first order based at least in part on a second order of the sets of bits in the information; and
- retransmitting a portion of the set of symbols based at least in part on a likelihood of error associated with the message.

23. The method of claim 22, further comprising:
- encoding the set of symbols using a spinal code based at least in part on hashing each set of the sets of bits and a spine of a set of spines associated with the spinal code; and
- mapping each set of the sets of bits to the symbol based at least in part on the spinal code.

24. The method of claim 22, further comprising:
- identifying the portion of the set of symbols for retransmission based at least in part on a puncturing scheme associated with the message, wherein retransmitting the portion of the set of symbols is based at least in part on the identifying.

25. The method of claim 24, further comprising:
- determining the puncturing scheme based at least in part on the first quantity of bits and the second quantity of bits.

26. The method of claim 22, wherein mapping each set of the sets of bits to the symbol is based at least in part on a spinal code associated with the message.

27. The method of claim 22, further comprising:
- receiving a feedback message indicating the error associated with the message, wherein retransmitting the portion is based at least in part on receiving the feedback message.

28. The method of claim 22, further comprising:
- identifying the first quantity of bits for each set of the first subset and the second quantity of bits for each set of the second subset based at least in part on an average codeword size constraint.

* * * * *